(12) United States Patent
Braun

(10) Patent No.: US 11,535,484 B2
(45) Date of Patent: Dec. 27, 2022

(54) HOSE REEL

(71) Applicant: REELCRAFT INDUSTRIES, INC., Columbia City, IN (US)

(72) Inventor: Joshua Thomas Braun, Fort Wayne, IN (US)

(73) Assignee: Reelcraft Industries, Inc., Columbia City, IN (US)

( * ) Notice: Subject to any disclaimer, the term of this patent is extended or adjusted under 35 U.S.C. 154(b) by 0 days.

(21) Appl. No.: 17/259,863

(22) PCT Filed: Jul. 12, 2019

(86) PCT No.: PCT/US2019/041703
§ 371 (c)(1),
(2) Date: Jan. 12, 2021

(87) PCT Pub. No.: WO2020/014672
PCT Pub. Date: Jan. 16, 2020

(65) Prior Publication Data
US 2021/0276822 A1    Sep. 9, 2021

Related U.S. Application Data

(60) Provisional application No. 62/831,590, filed on Apr. 9, 2019, provisional application No. 62/697,877, filed on Jul. 13, 2018.

(51) Int. Cl.
*B65H 75/44* (2006.01)
*F16L 3/01* (2006.01)

(52) U.S. Cl.
CPC ..... *B65H 75/4478* (2013.01); *B65H 75/4486* (2013.01); *F16L 3/012* (2013.01); *Y10T 137/6929* (2015.04)

(58) Field of Classification Search
CPC ............ B65H 75/4478; B65H 75/4486; Y10T 137/6929; Y10T 137/6932; Y10T 137/6954; Y10T 137/6958
See application file for complete search history.

(56) References Cited

U.S. PATENT DOCUMENTS 3,050,078 A * 8/1962 Hooper ................. B65H 75/38
251/83
4,512,361 A * 4/1985 Tisbo ................. B65H 75/4465
137/355.27
(Continued)

FOREIGN PATENT DOCUMENTS

DE    202004014200 U1    11/2004
EP       2 502 866 B1    10/2014
(Continued)

OTHER PUBLICATIONS

International Search Report and Written Opinion for PCT Application No. PCT/US2019/041703, dated Oct. 2, 2019, 12 pages, United States.

(Continued)

*Primary Examiner* — Kevin F Murphy
(74) *Attorney, Agent, or Firm* — Stinson LLP

(57) ABSTRACT

A hose reel for coiling a hose includes a frame and a reel assembly rotatably connected to the frame about an axis of rotation. The reel assembly includes a drum assembly having a drum surface configured to receive and support the hose as the drum assembly is rotated about the axis of rotation to coil the hose around the drum surface. The drum assembly includes a hose fitting defining a fluid outlet. The hose fitting is configured to be connected to one end of the hose to fluidly connect the hose to the fluid outlet. The drum assembly defines a recess in the drum surface in which the fluid outlet of the hose fitting is disposed such that at least (Continued)

a portion of the fluid outlet is disposed between the axis of rotation and the drum surface.

33 Claims, 23 Drawing Sheets

(56) References Cited

U.S. PATENT DOCUMENTS

| | | | | |
|---|---|---|---|---|
| 5,381,981 | A * | 1/1995 | Nelson | B65H 75/22 |
| | | | | 137/355.27 |
| 6,877,687 | B2 * | 4/2005 | Moon | B65H 75/4471 |
| | | | | 137/355.27 |
| 7,216,666 | B2 * | 5/2007 | Levy | B65H 75/4489 |
| | | | | 137/355.19 |
| 8,702,026 | B2 * | 4/2014 | Evans | B65H 75/241 |
| | | | | 242/395 |
| 9,073,731 | B2 * | 7/2015 | Arcati | F16L 37/086 |
| 9,463,951 | B1 * | 10/2016 | Davis, Jr. | B65H 75/34 |
| 9,808,839 | B2 | 11/2017 | Liu et al. | |

FOREIGN PATENT DOCUMENTS

| | | |
|---|---|---|
| JP | S63136753 U | 9/1988 |
| JP | 3642518 B2 | 4/2005 |
| JP | 4159687 B2 | 10/2008 |

OTHER PUBLICATIONS

Extended European Search Report for Application No. 19834511.8, dated Apr. 4, 2022, 8 pages Munich, Germany.

* cited by examiner

HOSE REEL

This application is a national application filed under 35 U.S.C. § 371 of International Application No. PCT/US2019/041703, filed Jul. 12, 2019, which claimed priority to Provisional Patent Application No. 62/831,590, filed Apr. 9, 2019 and Provisional Patent Application No. 62/697,877, filed Jul. 13, 2018, the entire contents of each of which are incorporated herein by reference in its entirety.

FIELD OF THE INVENTION

The present invention generally relates to a hose reel, and more specifically, to the connection of a hose to the hose reel.

BACKGROUND

Hose reels are used to conveniently store hoses in a wrapped configuration around a spool. Generally, one end of the hose is attached to the hose reel, which is fluidly connected to a fluid source such as a water utility pipe, so that hose can be used to carry and discharge the fluid while all or a portion of the hose is wrapped or coiled on the spool. With conventional hose reels, the end of the hose is typically connected to an outlet disposed outside the spool. As a result, as the hose is wound on the spool, the outlet creates an obstruction in the first few wound layers the hose must navigate around.

SUMMARY OF THE DISCLOSURE

In one aspect, a hose reel for coiling a hose comprises a frame and a reel assembly rotatable connected to the frame about an axis of rotation. The reel assembly includes a drum assembly having a drum surface configured to receive and support the hose as the drum assembly is rotated about the axis of rotation to coil the hose around the drum surface. The drum assembly includes a hose fitting defining a fluid outlet. The hose fitting is configured to be connected to one end of the hose to fluidly connect the hose to the fluid outlet. The drum assembly defines a recess in the drum surface in which the fluid outlet of the hose fitting is disposed such that at least a portion of the fluid outlet is disposed between the axis of rotation and the drum surface.

Other objects and features of the present invention will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
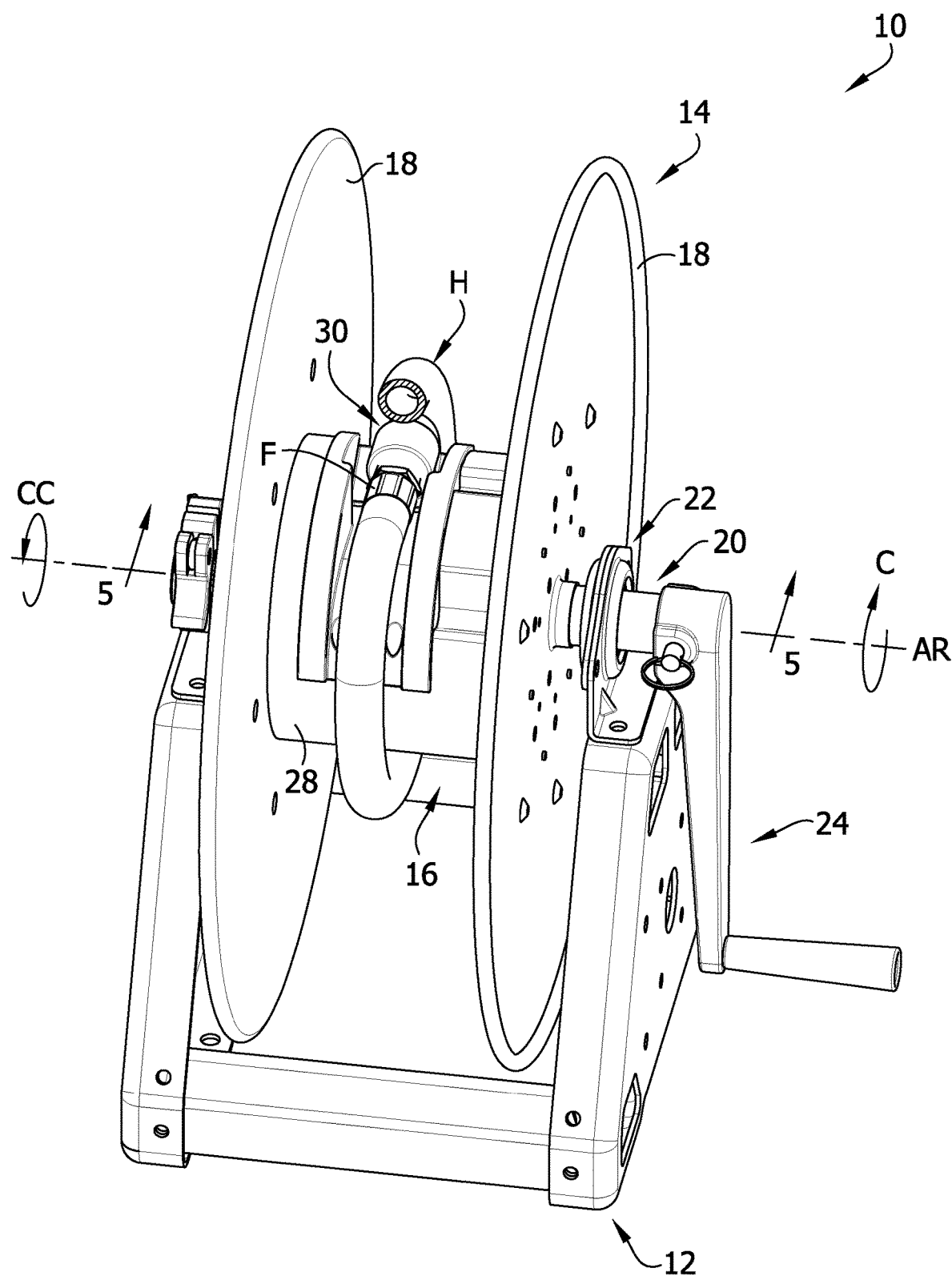
FIG. 1 is a perspective of one embodiment of a hose reel of the present disclosure having a hose coupled thereto.
Figure 2:
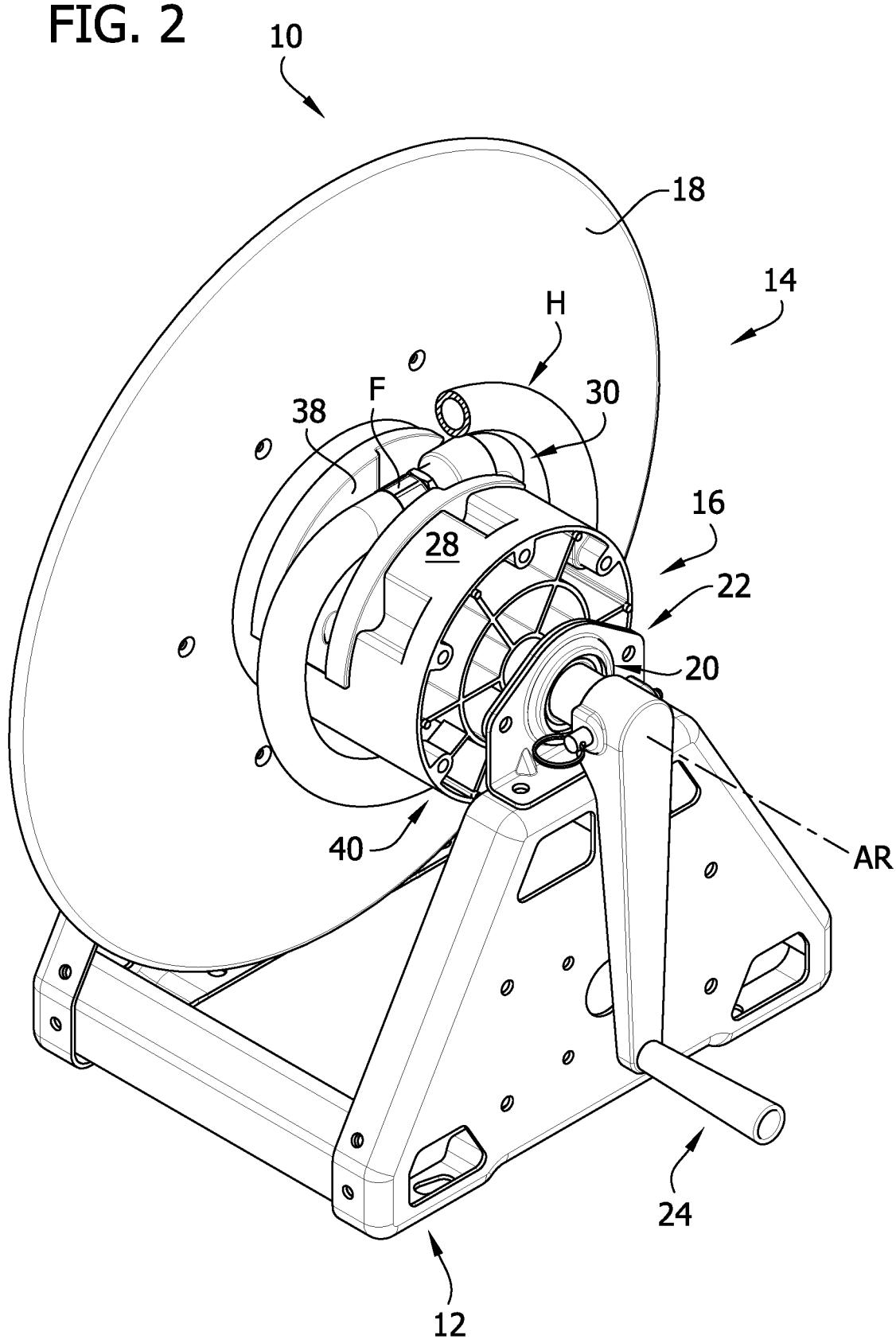
FIG. 2 is a perspective of the hose reel with one side flange removed therefrom.
Figure 3:
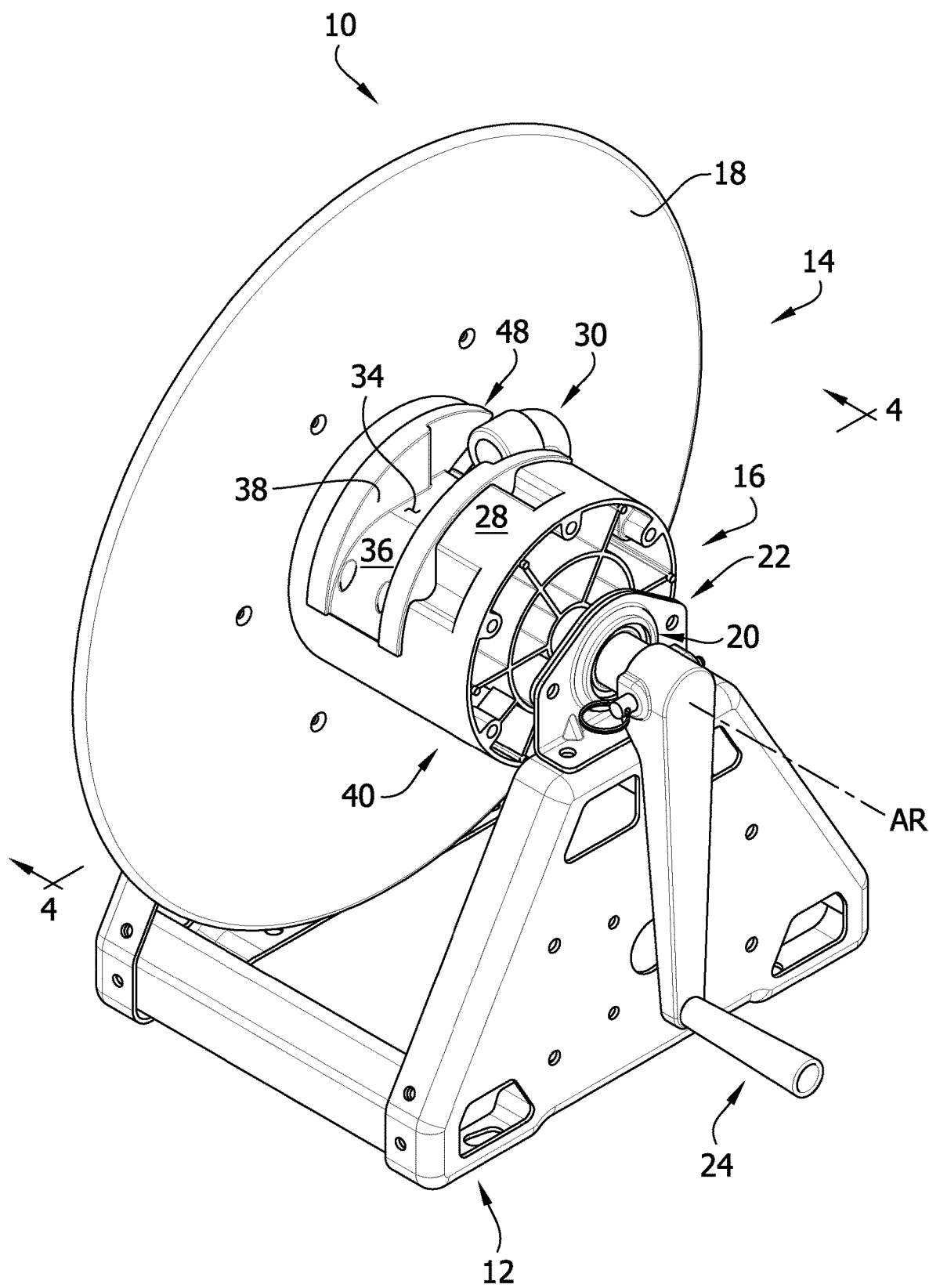
FIG. 3 is the perspective of FIG. 2 with the hose removed.

Referring now to FIGS. 1-6, a hose reel constructed according to one embodiment of the present disclosure is generally indicated by reference numeral 10. The hose reel 10 includes a frame 12 and a spool or reel assembly 14 rotatably connected to the frame. The reel assembly 14 rotates about an axis of rotation AR. The reel assembly 14 connects to one end of a hose H and rotates about the axis of rotation AR to wrap or coil the hose on the reel assembly or to feed out the hose from the reel assembly. The hose reels described herein, including hose reel 10, can be used in generally any type of spray truck such as a lawn care truck, a pest control truck, a pressure washing truck, or a fire truck. Generally, the hose reels described herein may be used in any application where it is desirable to store the hose H in a coiled configuration. In the illustrated embodiments, only a portion of the hose H is shown but it is understood the hose can be of any length, such as 100 ft. (31 m).

Figure 12:
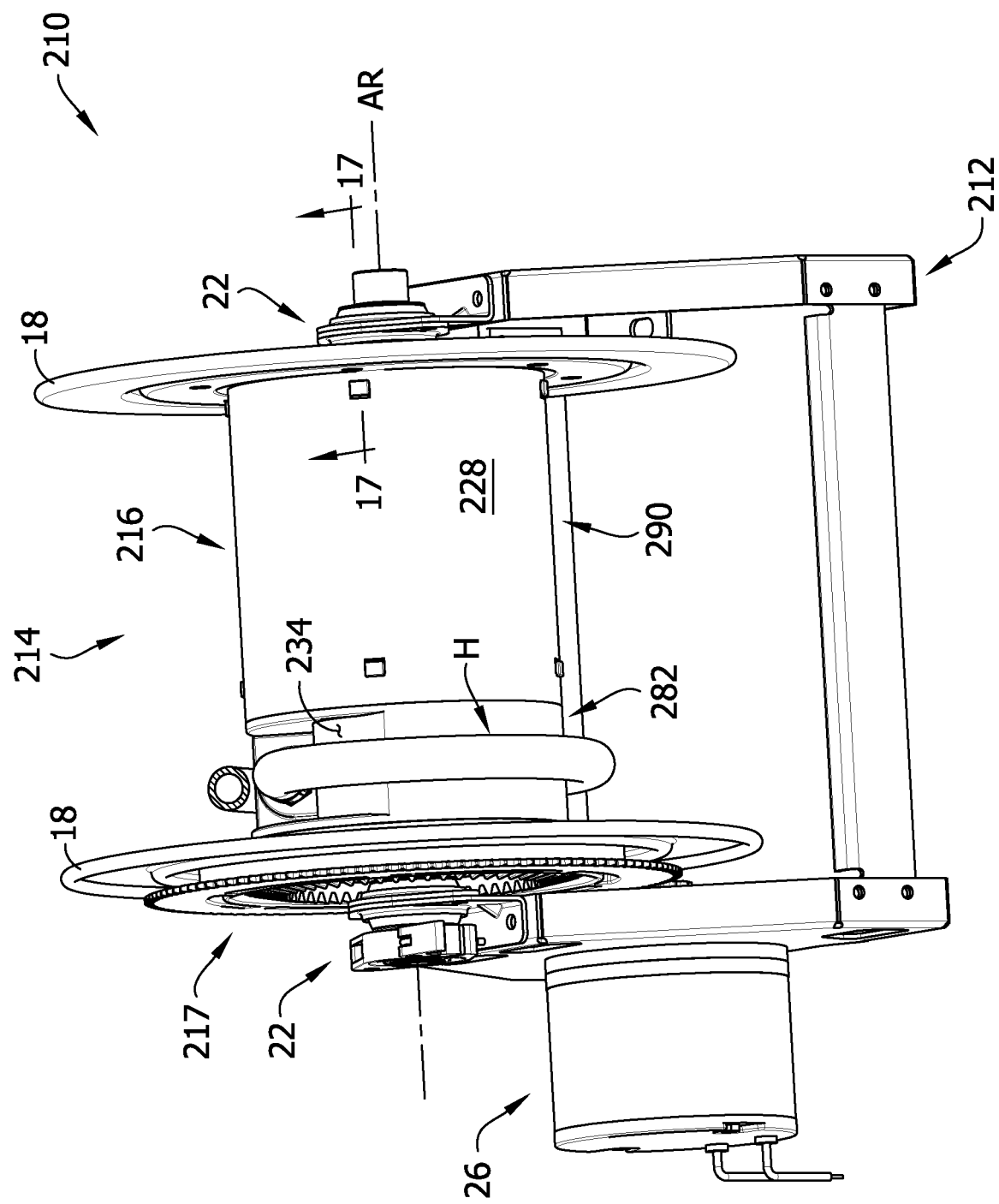
FIG. 12 is a perspective of another embodiment of a hose reel of the present disclosure having a hose coupled thereto.
Figure 13:
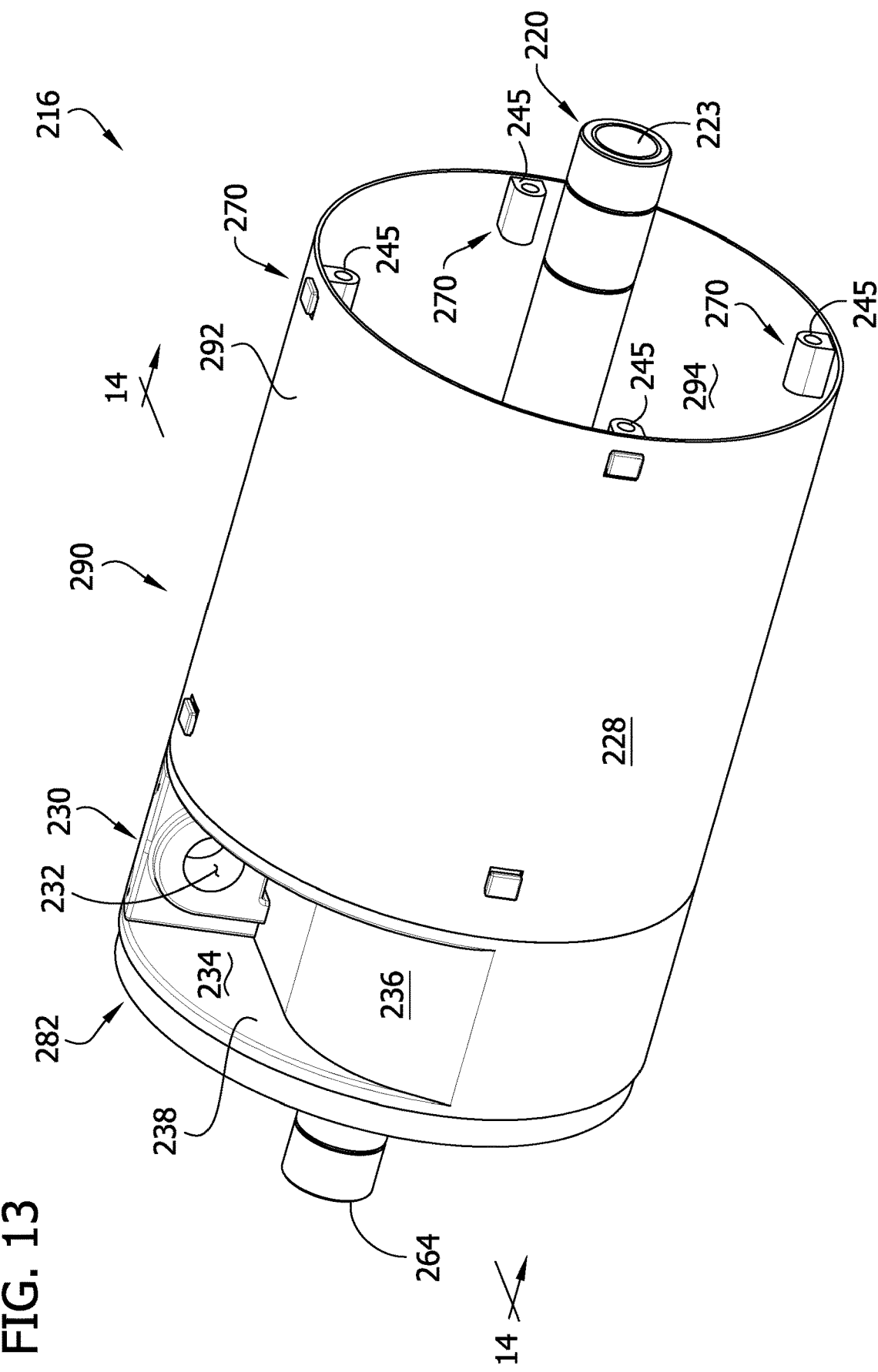
FIG. 13 is a rear perspective of a drum assembly of the hose reel of FIG. 12.

The reel assembly 14 is configured to receive and store the hose H wound thereon. The reel assembly 14 includes a drum assembly 16 and opposite first and second side flanges 18 attached to either end of the drum assembly. The drum assembly 16 (broadly, the reel assembly 14) includes an axle (broadly, an axle assembly) 20. Each end of the axle 20 extends through one of the side flanges 18. The axle 20 defines the axis of rotation AR the reel assembly 14 can rotate about. The side flanges 18 are generally circular, but can have other shapes, and extend radially outward from the axle 20. The side flanges 18 are mirror images of one another and include various openings (e.g., fastener openings) used to connect different components of the reel assembly together and/or accessories (not shown) to the reel assembly 14. For example, the side flanges 18 can include countersunk fastener openings that receive a fastener to connect the side flange to a sprocket operatively coupled to a motor 26 (see the embodiment of FIG. 12). The side flanges 18 keep the hose H on the reel assembly 14 as the reel assembly is rotated to coil or uncoil the hose. Each end of the axle 20 is supported by bearings 22 connected to the frame. The bearings 22 permit the reel assembly 14 to rotate in either the clockwise C or counter-clockwise CC direction to wind or unwind the hose H from the reel assembly.

The hose reel 10 may include a prime mover operatively coupled to the reel assembly 14 to rotate the reel assembly about the axis of rotation AR. The prime mover can rotate the reel assembly 14 either clockwise C or counter-clockwise CC about the axis of rotation AR. In the illustrated embodiment, the prime mover is a crank 24 connected to one end of the axle 20. An operator can manually rotate the reel assembly in either the clockwise C or counter-clockwise CC direction by using the crank 24. In other embodiments, the prime mover may be a motor 26 (FIG. 12), such as an electric motor, operatively connected to the reel assembly 14 via a gear mechanism or a chain and sprocket, for example. Other arrangements are within the scope of the present disclosure.

Referring to 1-9, the drum assembly 16 has drum 40 including a drum surface 28 (broadly, an exterior surface) that receives and supports the hose H as the drum assembly is rotated about the axis of rotation AR to coil the hose around the drum surface. The drum surface 28 is generally cylindrically shaped. The center or longitudinal axis defined by the drum surface 28 is generally co-extensive with the axis of rotation AR. The drum surface 28 extends between the side flanges 18, when the side flanges are attached to the drum assembly 16, as described in more detail below (e.g., the side flanges abut the drum surface). The drum assembly 16 includes a hose connector or fitting 30 defining a fluid outlet 32. The hose fitting 30 is configured to connect to one end of the hose H to fluidly connect the hose to the fluid outlet 32.

The drum assembly 16 defines a recess 34 in the drum surface 28. In particular, the recess 34 extends radially inward toward the axle 20 (e.g., axis of rotation AR) from the drum surface 28. The fluid outlet 32 of the hose fitting 30 is disposed (broadly, at least partially disposed) within the recess 34 such that the fluid outlet is disposed (broadly, at least partially disposed) between the axis of rotation AR and the drum surface 28. In the illustrated embodiment, the fluid outlet 32 is disposed entirely between the axis of rotation AR and the drum surface 28. In other words, the fluid outlet 32 is disposed radially inward from the drum surface 28. Due to this configuration, when the end of the hose H is connected to hose fitting 30 at the fluid outlet 32, the end of the hose is disposed within the recess 34 and radially inward of the drum surface 28. As a result, as the hose H is coiled around the drum surface 28, successive layers of the hose lay over the fluid outlet 32 without being obstructed by the end of the hose as the hose winds around the reel assembly 14. In other words, the connection point (e.g., fluid outlet 32) between the drum assembly 16 and the hose H is recessed into the drum assembly, to move the connection point out of the way of successive layers of the coiled hose. It is understood that other arrangement of the fluid outlet 32 and drum surface 28 are included within the scope of the present disclosure, including without limitation having at least part of the fluid outlet being located between the axis of rotation AR and the drum surface 28.

As generally known in the art, the end of the hose H typically has a rigid (e.g., metal) coupler F used to connect the end of the hose to another component, such as the hose fitting 30. This coupler F may damage, deform, and/or impede successive layers of the hose H as the hose is coiled around the drum assembly 16. By positioning the fluid outlet 32 within the recess 34, the end of the hose H, including the coupler F, is moved below the drum surface 28 which eliminates the obstruction formed when the hose is connected to a conventional hose reel. It is believed that by moving the fluid outlet 32 below the drum surface 28, a better hose transition is created as the hose H extends from and wraps around the drum assembly 16 by allowing the hose to lay smoothly over the connection point without significant deformation as the hose is wound around the drum surface. As a result, the flow the fluid (e.g., water) through the hose reel 10 and connected hose H is improved. Preferably, the fluid outlet 32 is proximate to the drum surface 28.

The recess 34 guides the hose H from the fluid outlet 32 to the drum surface 28. In particular, the recess 34 guides the hose H such that the hose extends from the recess 34 in a direction that is generally perpendicular to the axis of rotation AR. As a result, the hose H is positioned in an orientation in which the hose can immediately begin wrapping around the drum surface 28 without having to make any further bends or changes in direction. In the illustrated embodiment, the opening of the fluid outlet 32 lies in a plane that is generally parallel to the axis of rotation AR. As a result, due to the connection of the hose H to the hose fitting 30 at the fluid outlet 32, the hose generally extends from the fluid outlet in a direction that is generally perpendicular to the axis of rotation AR (i.e., around the drum surface 28). This creates a smooth transition as the hose H extends from the fluid outlet 32 and around the drum assembly 16. The recess 34 is defined by a recess surface 36 and opposite side walls 38 of the drum assembly 16. The side walls 38 extend generally perpendicular to the axis of rotation AR. The hose fitting 30 generally defines one end of the recess 34.

Figure 4:
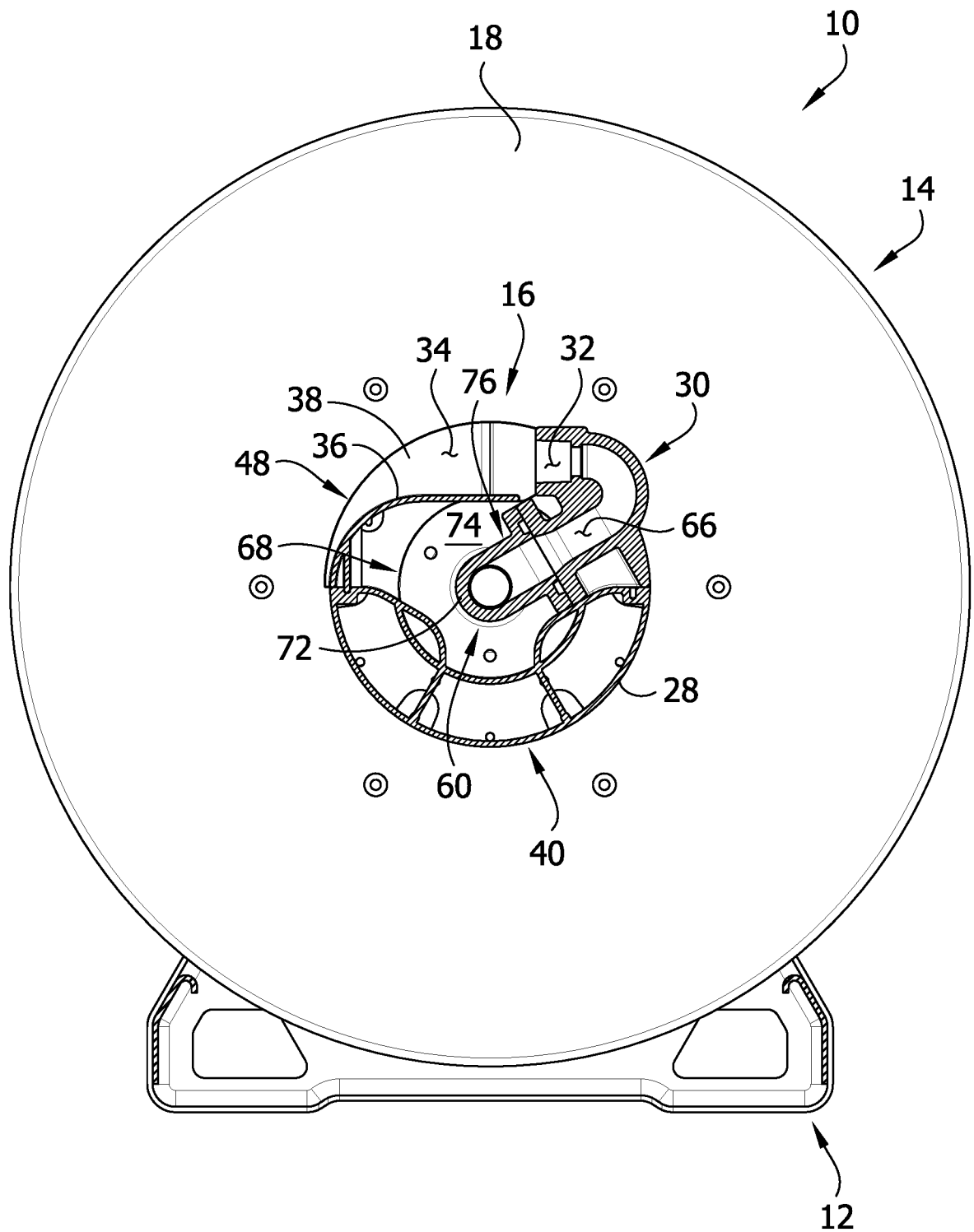
FIG. 4 is a cross-section of the hose reel taken through line 4-4 of FIG. 3.

As shown in FIG. 4, the recess surface 36, which defines the bottom of the recess 34, extends from about the fluid outlet 32 (e.g., from generally below or radially inward of the fluid outlet) to the drum surface 28. The recess 34 has a depth extending between the drum surface 28 and the recess surface 36. The depth of the recess 34 at the fluid outlet 28 is larger than the diameter of the hose H to enable the entire coupler F to be received in the recess. As shown in FIG. 4, the depth of the recess 34 increases as the recess surface 36 extends from the drum surface 28 to the fluid outlet 32. In the illustrated embodiment, the portion of the recess surface 36 extending from the drum surface 28 is curved about the axis of rotation AR. This provides a smooth transition for the hose H as the hose extends out from the recess 34 and onto the drum surface 28. In the illustrated embodiment, the recess 34 is wider at the fluid outlet 32 to better accommodate the coupler F of the hose H.

Referring to FIGS. 3-9, the particular configuration and construction of the drum assembly 16 will now be described. As will become apparent, other configurations and constructions of the drum assembly 16 are within the scope of the present disclosure, some of which are described herein. It is understood that one or more of the elements discussed above may be defined and/or a part of one or more of the components of the drum assembly 16. The drum assembly 16 includes a drum 40. The drum 40 is generally cylindrical in shape and defines most of the drum surface 28. Each end of the drum 40 is configured to connect to one of the side flanges 18. In the illustrated embodiment, the drum 40 includes one or more fastener openings 44 (e.g., six fastener openings) at each end thereof that align with corresponding fastener openings in one of the side flanges 18 so that fasteners (not shown), such as bolts, can be inserted therethough to connect the drum 40 to the side flanges. The fastener openings 44 may or may not be threaded. The drum 40 defines a central opening 42 extending there-through. The axle 20 extends through the central opening 42 and out through either end of the drum 40.

Figure 8:
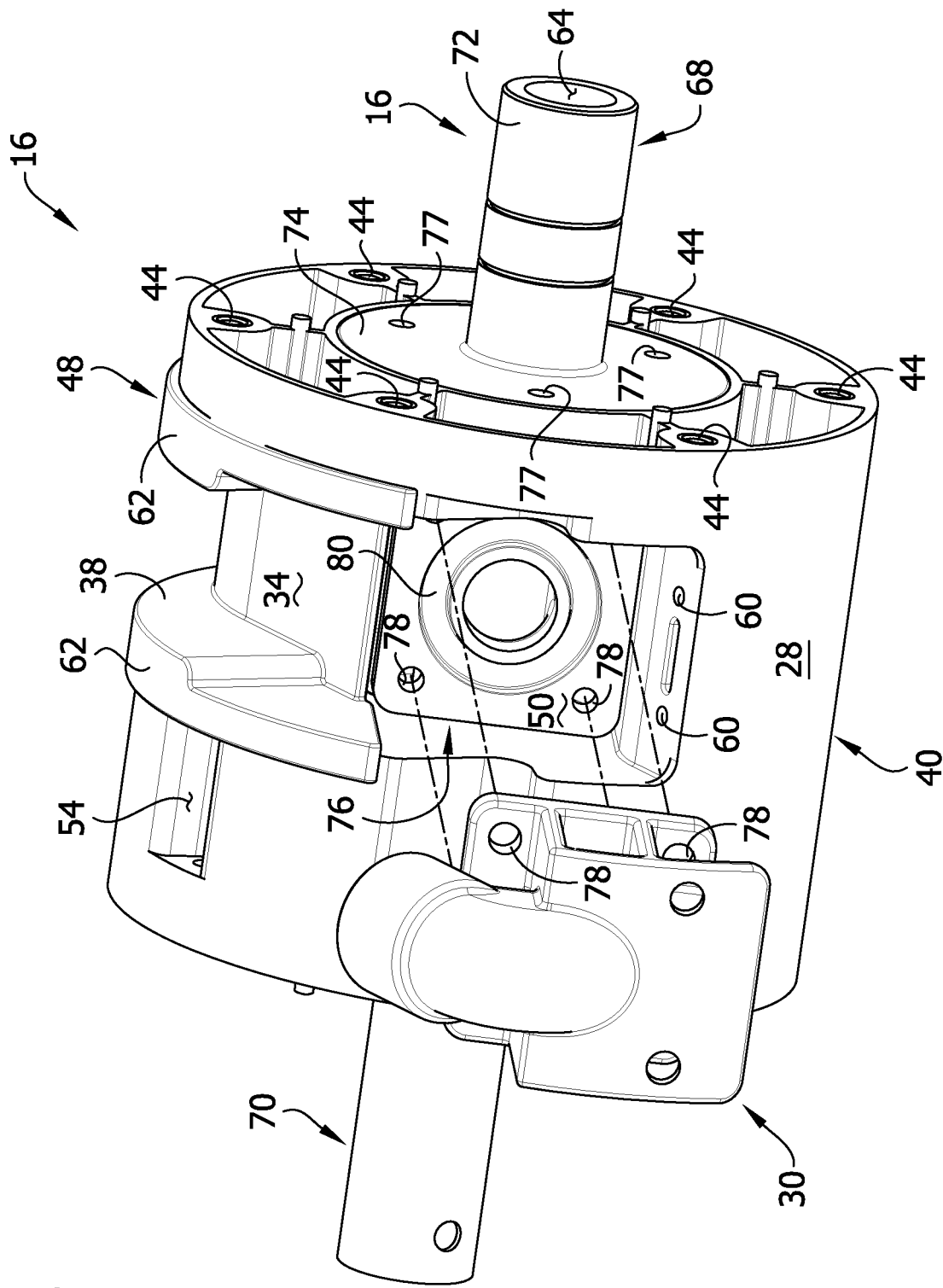
FIG. 8 is a partially exploded rear perspective of the drum assembly.
Figure 9:
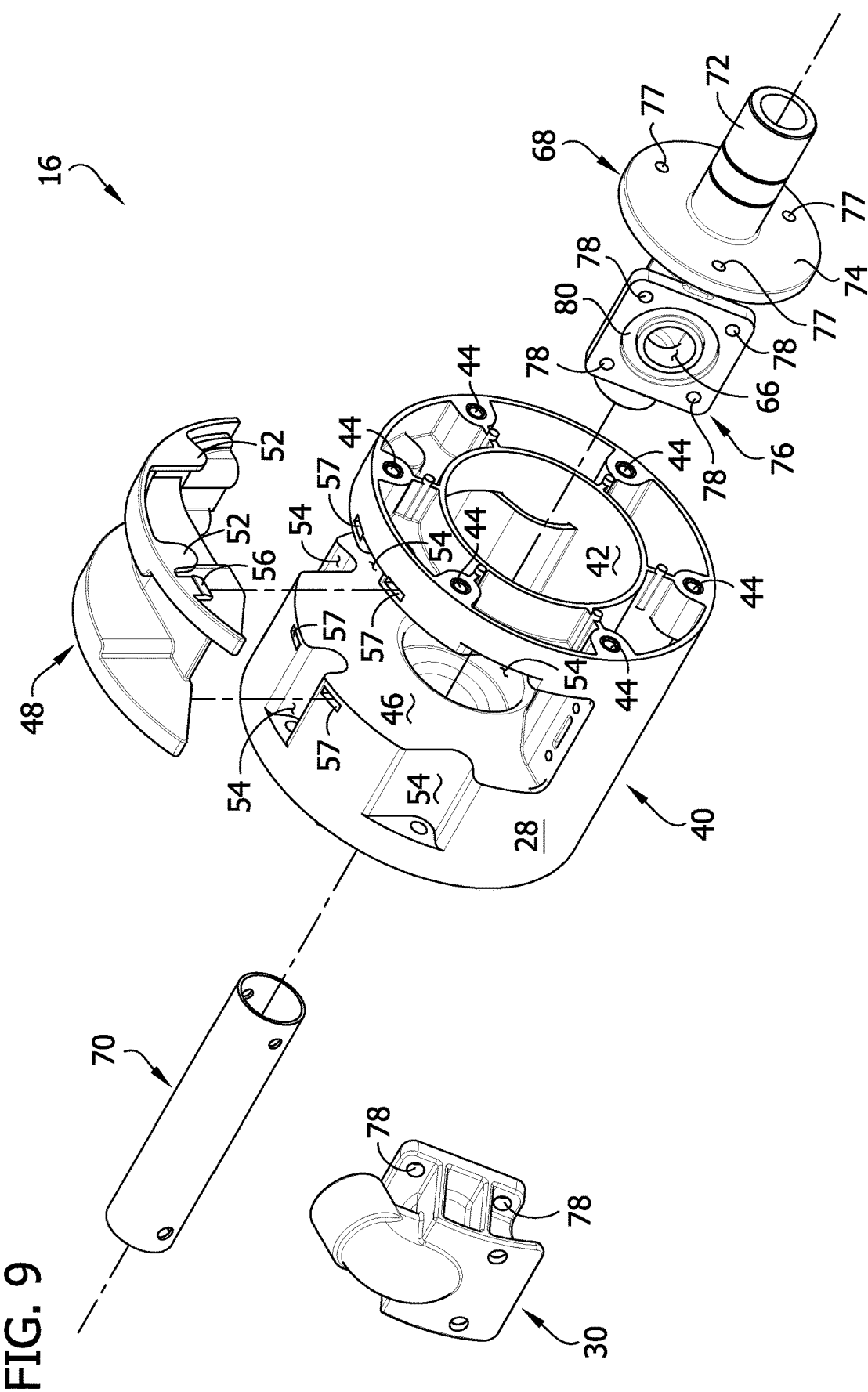
FIG. 9 is an exploded rear perspective of the drum assembly.

In the illustrated embodiment, the drum 40 defines a channel 46 (FIG. 9) extending across the drum 40 (e.g., generally perpendicular to the axis of rotation AR) and to the central opening 42. A recess insert 48 is received in the channel 46. The recess insert 48 generally defines the recess 34 of the drum assembly 16. Thus, the recess insert 48 includes the recess surface 36 and side walls 38. When connected to the drum 40, the recess insert 48 generally fills and covers a portion of the channel 46. When connected, the drum 40 and recess insert 48 define a space 50 (e.g., a portion of the channel 46) in which the hose fitting 30 is disposed, as discussed in more detail below (FIG. 8). Each side of the recess insert 48 includes one or more projections 52 (broadly, male connectors) that each mate with a receptacle 54 (broadly, female connectors) in the drum 40 to position the recess insert relative to the drum (FIG. 9). Each side of the recess insert 48 also includes a detent or catch 56 that is received in a respective one of four rectangular openings 57 in the drum 40 to hold the recess insert thereon. A lip 62 extends from either side of the recess insert 48 and extend over a portion of the exterior surface of the drum 40. The lips 62 form part of the drum surface 28. The recess insert 48 may be attached to the main body in either orientation within the channel 46 to allow the drum assembly 16 to be set up for clockwise C or counter-clockwise CC winding of the hose H. For example, in the illustrated embodiment, the orientation of the recess insert 48 is such that the drum assembly is set up for clockwise C rotation of the drum assembly 16 to wind the hose H on the drum assembly (FIG. 1). Alternatively, the recess insert 48 can be turned around (e.g., rotated 180 degrees) from the orientation shown and secured to the drum 40 to configure the drum assembly 16 for counter-clockwise CC rotation of the drum assembly to wind the hose H on the drum.

Referring back to FIGS. 1-9, the hose reel 10 includes a fluid inlet 64 (FIG. 5) configured to be fluidly connected to a fluid source (not shown). The fluid inlet 64 is disposed adjacent or next to one end of the axle 20. In the illustrated embodiment, one end of the axle 20 defines the fluid inlet 64. In this embodiment, the fluid inlet 64 is generally aligned with the axis of rotation AR. In another embodiment, the end of the axle 20 may be connected to a swivel attachment (not shown) that defines the fluid inlet. The swivel attachment connects to the fluid source and allows the reel assembly 14 to rotate with respect to the fluid source when the fluid source is connected to the reel assembly. Other configurations of the fluid inlet are within the scope of the present disclosure. The reel assembly 14, in particular the drum assembly 16, defines a fluid passageway 66 (FIGS. 4 and 5) extending from the fluid inlet 64 to the fluid outlet 32 to fluidly connect the hose H to the fluid source. The fluid outlet 32 is radially spaced apart from the axis of rotation AR and, therefore, the fluid inlet. The fluid passageway 66 provides a flow path between the radial spaced apart fluid inlet 64 and outlet 32.

The axle 20 defines a portion (broadly, at least a portion) of the fluid passageway 66. In the illustrated embodiment, the axle 20 (broadly, an axle assembly) of the drum assembly 16 includes a fluid body portion 68 and a shaft 70. The fluid body portion 68 defines a portion of the fluid passageway 66. The fluid body portion 68 includes a generally cylindrical wall 72 (e.g., pipe) defining a portion of the fluid passageway 66. One end of the cylindrical wall 72 defines one end of the axle 20 and the fluid inlet 64. The opposite end of the cylindrical wall 72 is closed. Accordingly, the cylindrical wall 72 is configured to extend through one of the side flanges 18 and be supported by one of the bearings 22. The shaft 70 is coupled to the fluid body portion 68 and extends from the closed end of the cylindrical wall 72. A set screw (not shown) may be used to secure the shaft 70 to the fluid body portion 68. The shaft 70 defines the other end of the axle 20. Accordingly, the shaft 70 is configured to extend though one of the side flanges 18 and be supported by one of the bearings 22.

The fluid body portion 68 includes an annular attachment flange 74 that extends radially outward from the cylindrical wall 72. The attachment flange 74 includes one or more fastener openings 77 that align with corresponding fastener openings in one or both of one of the side flanges 18 and/or drum 40 so that fasteners (not shown), such as bolts, can be inserted there-though to connect the fluid body portion 68 to one or both of said one side flange and/or fluid body portion. The fluid body portion 68 also includes a connector portion 76. The connector portion 76 defines a portion of the fluid passageway 66 and connects to the hose fitting 30. The connector portion 76 extends radially outward from the cylindrical wall 72 and is disposed between the closed end of the cylindrical wall and the attachment flange 74. The connector portion 76 includes a generally planar exterior surface that engages a planar exterior surface of the hose fitting 30 when the two are coupled together. Preferably, the hose fitting 30 is releasably coupled to the fluid body portion (broadly, a portion of the drum assembly 16). In the illustrated embodiment, one or more fasteners (not shown) are used to secure the hose fitting 30 to the fluid body portion 68. Each of the hose fitting 30 and fluid body portion 68 define fastener openings 78 that align with one another to so that the fasteners, such as bolts, can be inserted there-though. The fastener openings 78 in the fluid body portion 68 are preferably threaded. A seal (not shown), such as an O-ring, may be positioned between the fluid body portion 68 and the hose fitting 30 to form a fluid tight seal there-between. One or both of the exterior surfaces of the fluid body portion 68 and the hose fitting 30 may define a circumferential groove 80 that receives the seal.

When positioned within the drum 40, the fluid body portion 68 and shaft 70 are disposed in and extend through the central opening 42. When positioned in the central opening 42 of the drum 40, the connector portion 76 is generally aligned with the space 50 defined between the drum and the recess insert 48 (FIG. 8). When connected to the fluid body portion 68, the hose fitting 30 is disposed in and extends through the space 50. In this position, the fluid outlet 32 of the hose fitting 30 is located in the recess 34. Thus, the hose fitting 30 defines the portion of the fluid passageway 66 extending from the fluid body portion 68 to the fluid outlet 32. Due to the configuration of the drum assembly 16, the fasteners that extend through the fastener openings 78 to connect the hose fitting 30 to the fluid body portion 68 are accessible by a tool from the exterior of the drum assembly. This permits an operator to selectively disconnect and reattach the hose fitting 30 from the rest of the drum assembly 16 (e.g., fluid body portion). This removability of the hose fitting 30 creates a quick and easy way to attach the hose H to the reel assembly 14. Connecting the hose H to the reel assembly 14 requires threading the hose onto the hose fitting 30. Removing the hose fitting 30 from the reel assembly 14 allows the hose to be connected to the fluid outlet 32 by rotating the hose fitting 30. Connecting the hose H to a small component, like the hose fitting 30, is much easier than connecting the hose directly to the entire reel assembly 14 because the small component can be easily rotated. Further, connecting the hose H to the removed hose fitting 30 allows tools, such as wrenches, to be used to connect the components together. Once the hose H is connected to the hose fitting 30, the hose fitting can then be reattached to the rest of the drum assembly 16 (e.g., fluid body portion 68), to connect the hose to the reel assembly 14. In other embodiments, a hose coupler (not shown), such as a quick connect fitting, may be used to connect the hose H to the hose fitting 30 of the reel assembly 14.

The drum 40 is, preferably, integrally formed as a single, one-piece component. Because the drum 40 is a one-piece component and is connected to both side flanges 18, the drum forms a stronger connection between the drum assembly 16 and the side flanges than conventional hose reels which use tie rods that twist and flex as the reel assembly is rotated. The drum 40 may be of generally any length. In one embodiment, the drum assembly 16 may include an extension portion (not shown) connected to the drum 40 to increase the length of the drum assembly. The drum 40 can be formed from metal, plastic, glass filled nylon or any other suitable material. In the illustrated embodiment, the drum 40 is molded from plastic. As a result, the drum 40 includes several internal ribs to strengthen and stiffen the drum. It is understood the various components of the hose reel 10, in particular the components defining a portion of the fluid passageway 66, are configured to operate under the fluid pressure exerted by the fluid as the fluid flows through the hose reel and into the hose H.

Figure 10:
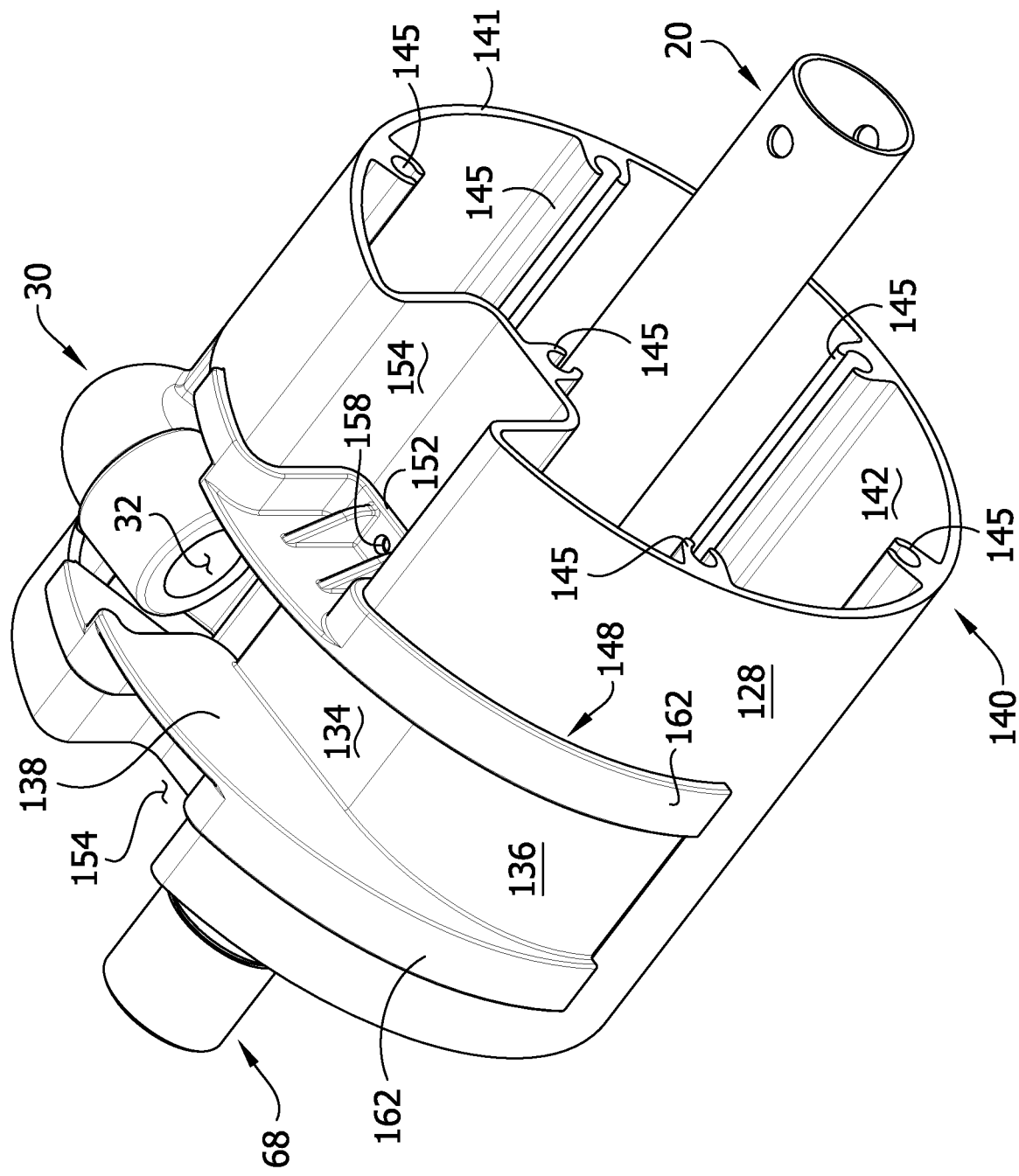
FIG. 10 is a front perspective of another embodiment of a drum assembly that can be used with the hose reel of FIG. 1.
Figure 11:
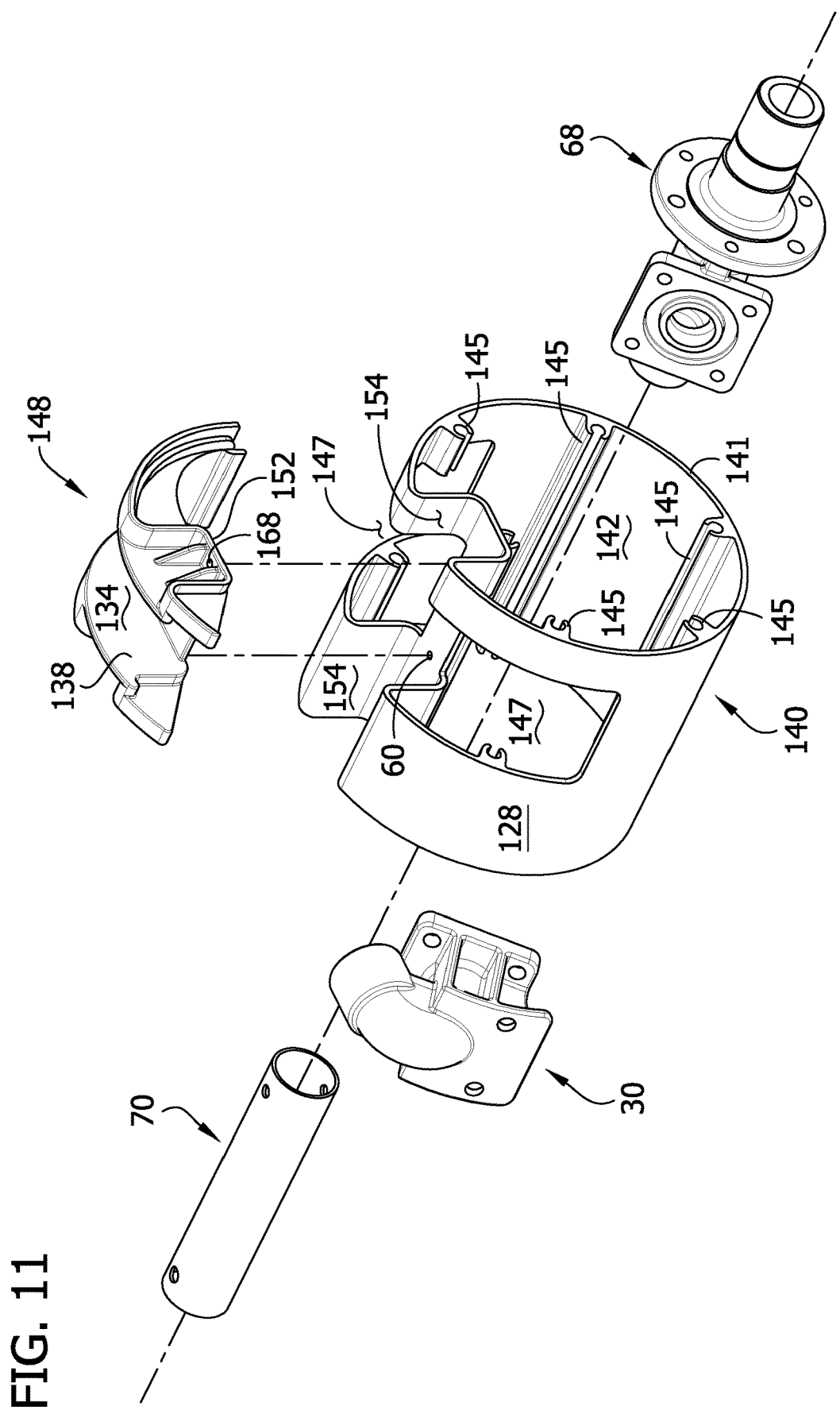
FIG. 11 is an exploded view of the drum assembly of FIG. 10.

Referring to FIGS. 10 and 11, another embodiment of a drum assembly that can be used with the hose reel 10, described above, is generally indicated at reference numeral 116. Drum assemblies 116 and 16 are interchangeable. Drum assembly 116 generally includes many, if not all, of the same elements and features as drum assembly 16. Where the drum assembly 116 includes identical elements to that of drum assembly 16, identical reference numerals are used. Where similar or analogous elements are used, reference numerals "100" units higher are employed. Drum assembly 116 includes an axle 20, a hose fitting 30, a drum 140 and a recess insert 148. The axle 20 (broadly, the axle assembly) includes a fluid body portion 68 and a shaft 70. The axle 20, fluid body portion 68, shaft 70, and hose connector 30 of drum assembly 116 are all identical to the axle, fluid body portion, shaft, and hose connector of drum assembly 16. The only difference between drum assembly 116 and drum assembly 16 is the construction of the drum 140 and recess insert 148 compared to the drum 40 and recess insert 48.

In this embodiment, the drum 140 is formed from extruded aluminum metal). The drum 140 includes a generally circumferential perimeter wall 141. The exterior of the perimeter wall 141 defines the drum surface 128. The perimeter wall 141 also defines the central opening 142, through which the axle 20 extends. Due to the strength of the aluminum, the drum 140 does not need all the ribs used to strengthen drum 40, and as a result the central opening 142 is larger than central opening 42. Instead of fastener openings 44, body portion 140 includes one or more C-shaped channels 145. Like fastener openings 44, each C-shaped channel 145 aligns with a corresponding fastener opening in one of the side flanges 18 so that fasteners (not shown), such as a self-tapping screw, can be inserted through the side flange 18 and into the C-shaped channel to connect the drum 140 to the side flanges. Self-tapping screws are preferably used so that as the screws are threaded into the C-shaped channels 145, screws cut and form threads in the channels.

In the illustrated embodiment, the drum 140 includes two openings 147 in the perimeter wall 141. The recess insert 148 is inserted into and covers at least one of the openings 147 when the recess insert is attached to the drum body potion 140. In the illustrated embodiment, recess insert 148 covers one opening 147 and extends into the other opening. The recess insert 148 defines the recess 134 of the drum assembly 16. The recess insert includes the recess surface 136 and side walls 138. When connected, the drum 140 and recess insert 148 define a space (e.g., a portion of one of the openings 147) in which the hose fitting 30 is disposed, as discussed above in relation to drum assembly 16 (FIG. 10). Each side of the recess insert 148 includes a projection 152 (broadly, male connectors) that mates with a corresponding receptacle 154 (broadly, female connectors) in the drum 140 to position recess insert relative to the drum (FIG. 10). In this embodiment, the receptacles 154 are longitudinal channels defined by the perimeter wall 141. The recess insert 148 includes one or more fastener openings 158 that align with corresponding fastener openings 160 of the drum 140 such that a fastener (not shown) can be inserted (e.g., threaded) there-through to secure the recess insert to the drum. In the illustrated embodiment, each projection 152 includes a fastener opening 158 and each receptacle 154 includes a fastener opening 160 as the base thereof. The recess insert 148 may be inserted into either of the openings 147 to position the recess insert in one of opposite orientations relative to the drum 140 in order to configure the drum assembly 116 for either clockwise C or counter-clockwise CC winding of the hose H, as discussed above. Otherwise drum assembly 116 is generally the same as drum assembly 16 and operates and functions in generally the same way. It is understood that one or more of the descriptions related to drum assembly 16 may also apply to drum assembly 116.

Referring to FIGS. 12-17, another embodiment of a hose reel of the present disclosure is generally indicated at reference numeral 210. Hose reel 210 is similar to hose reel 10. For ease of comprehension, where hose reel 210 includes identical elements to that of hose reel 10, identical reference numerals are used and where similar or analogous elements are used, reference numerals "200" units higher are employed. Hose reel 210 is generally the same as hose reel 10 except that hose reel 210 includes an electric motor 26 as the prime mover which is operatively coupled to the reel assembly 214 with a gear mechanism 217. In addition, another difference is that drum assembly 216 has a different construction than drum assembly 16. However, it is understood drum assembly 216 is interchangeable with the other drum assemblies disclosed herein and that the drum assembly 216 generally includes many, if not all, of the same elements and features as the other drum assemblies.

Referring to FIGS. 12-15, the particular configuration and construction of the drum assembly 216 will now be described. As is apparent, drum assembly 216 includes many of the same elements and advantages as drum assemblies 16 and 116. For example, drum assembly 216 includes a recess 234 in a drum surface 228 in which a fluid outlet 232 of a hose fitting 230 is disposed. Thus, where the drum assembly 216 includes similar or analogous elements and advantages as drum assemblies 16 and 116, a detailed description of such elements and advantages is omitted with the understanding that the descriptions related to the elements and advantages of drum assemblies 16 and 116 apply equally to drum assembly 216. In this embodiment, the drum assembly 216 includes a fluid body portion 282 and drum extension portion 290. The fluid body portion 282 and drum extension portion 290 are connected to one another and each define a portion of the drum surface 228.

The fluid body portion 282 defines the recess 234 through which the hose H extends when the hose is connected to the hose fitting 230. It is understood that the recess 234 could be defined by the extension portion 290, or by a combination of the fluid body portion 282 and the extension portion. As with the other drum assemblies 16, 116, the fluid outlet 232 of the hose fitting 230 of drum assembly 216 is disposed within the recess 234. The fluid body portion 282 is generally cylindrical in shape. The fluid body portion 282 includes the recess surface 236 and the opposite side walls 238 that define the recess 234. In this embodiment, the fluid body portion 282 defines a channel 246 extending across the fluid body portion 282 (e.g., generally perpendicular to the axis of rotation AR). The hose fitting 230 is disposed in the channel 246 when the hose fitting is connected to the fluid body portion 282. Preferably, the hose fitting 230 is releasably coupled to the fluid body portion 282. (broadly, a portion of the drum assembly 216). In the illustrated embodiment, one or more fasteners 279 (e.g., four fasteners) are used to secure the hose fitting 230 to the fluid body portion 282. Each of the hose fitting 30 and fluid body portion 282 define fastener openings 278 that align with one another to so that the fasteners 279, such as bolts, can be inserted there-though. The fastener openings 278 in the fluid body portion 282 are preferably threaded. Due to the configuration of the drum assembly 216, the fasteners 279 used to connect the hose fitting 230 to the fluid body portion 282 are accessible by a tool from the exterior of the drum assembly. In the illustrated embodiment, the hose fitting 230 engages a planar portion of the recess surface 236 when connected to the fluid body portion 282. A seal 281, such as an O-ring, may be positioned between the fluid body portion 282 and the hose fitting 230 to form a fluid tight seal there-between. One or both of the fluid body portion 282 and the hose fitting 230 may define a circumferential groove 280 that receives the seal.

In the illustrated embodiment, the hose fitting 230 has a width corresponding to the width of the channel 246 so that the hose fitting can be inserted into and removed from the channel. Together the hose fitting 230 and the fluid body portion 282 define the recess 234. In this embodiment, the recess 234 is, broadly, a portion of the channel 246. Moreover, in this embodiment, the hose fitting 230 defines a portion of the drum surface 228. The hose fitting 230 includes an exterior surface having a curve generally matching the curve of the exterior surfaces of the fluid body portion 282 and drum extension portion 290 such that when the hose fitting is connected to the fluid body portion, the exterior surface of the hose fitting is generally coincident with the other exterior surfaces.

One end or side of the fluid body portion 282 is configured to connect to one of the side flanges 18. In the illustrated embodiment, the fluid body portion 282 includes one or more fastener openings 244 (e.g., four fastener openings) at each end thereof. One set of fastener openings 244 on one end of the fluid body portion 282 align with corresponding fastener openings in one of the side flanges 18 so that fasteners (not shown), such as bolts, can be inserted there-though to connect the fluid body portion to said one side flange. The fastener openings 244 may or may not be threaded. The other set of fastener openings 244 on the opposite end of the fluid body portion 282 are used to connect the fluid body portion to the drum extension portion 290, as discussed in more detail below.

Figure 14:
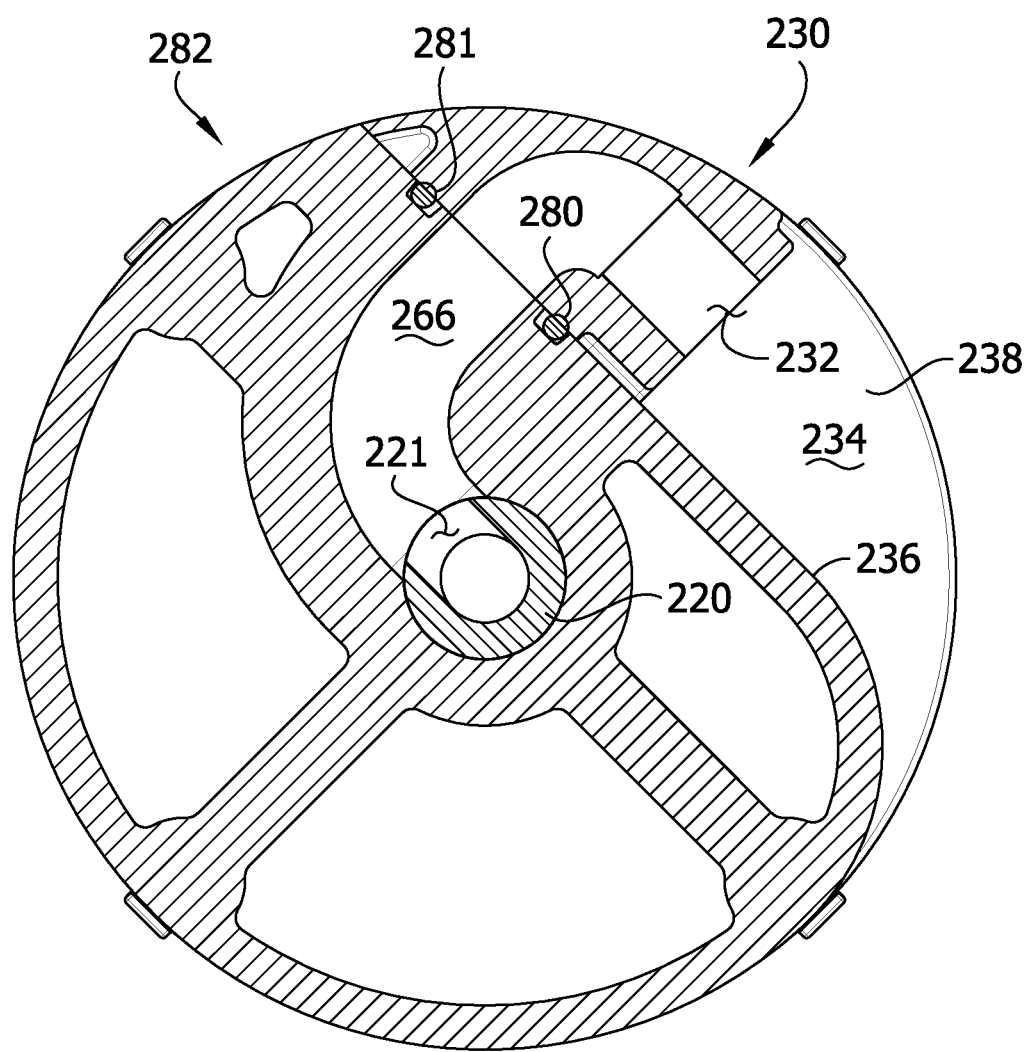
FIG. 14 is a cross-section of the drum assembly taken through line 14-14 of FIG. 13.
Figure 15:
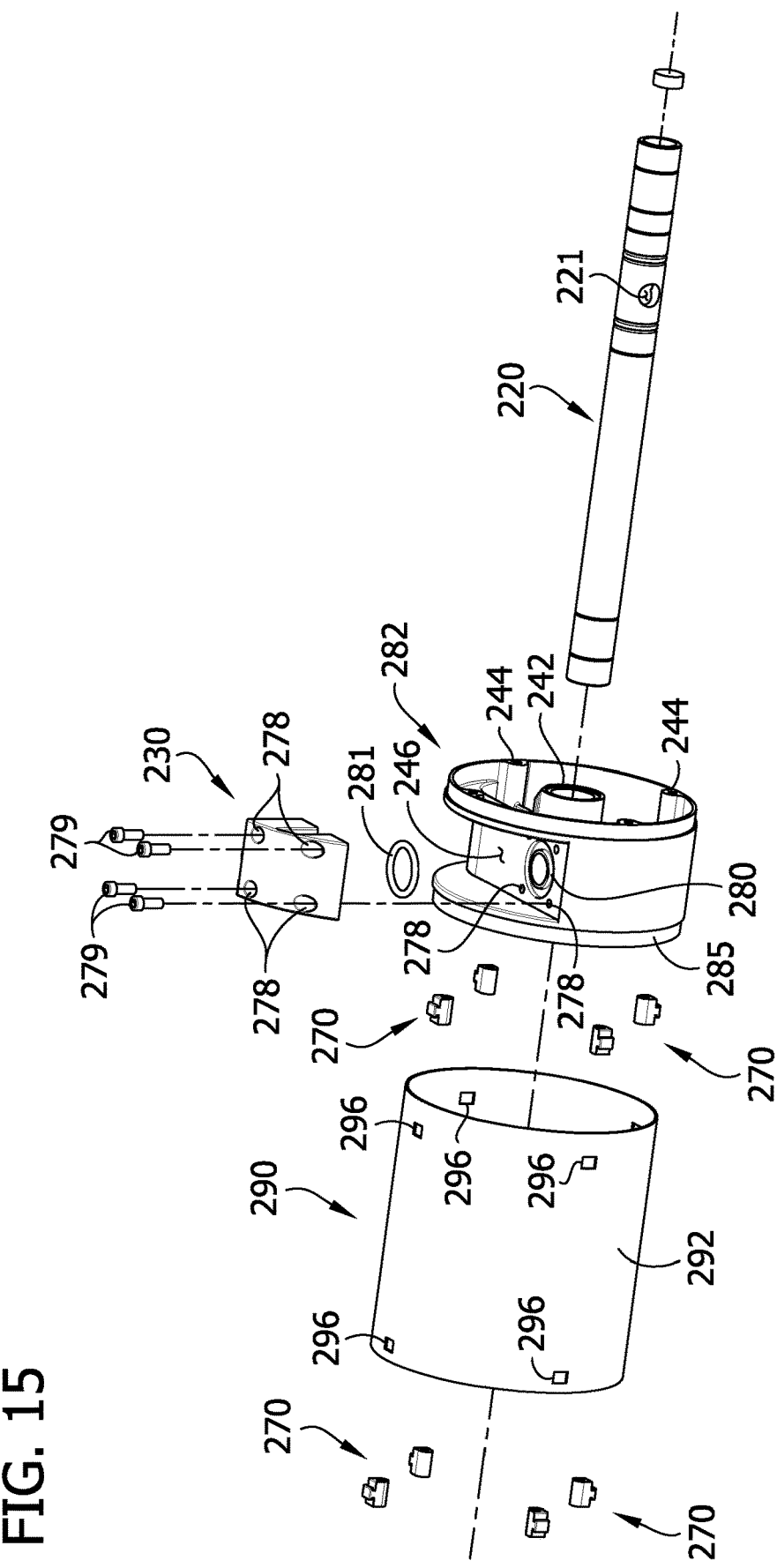
FIG. 15 is an exploded front perspective of the drum assembly of FIG. 13.

The hose reel 210 includes a fluid inlet 264 configured to be fluidly connected to a fluid source (not shown). The fluid inlet 264 is disposed adjacent or next to one end of the axle 220. In the illustrated embodiment, one end of the axle 220 defines the fluid inlet 264. The reel assembly 214, in particular the drum assembly 216, defines a fluid passageway 266 (FIG. 14) extending from the fluid inlet to the fluid outlet 232 to fluidly connect the hose H to the fluid source. In this embodiment, the axle 220 is a single component (e.g., a pipe, a shaft). The fluid body portion 282 defines a central opening 242 through which the axle 220 extends. The fluid body portion 282 is secured to the axle 220, such that the axle and fluid body portion rotate together. For example, a set screw (not shown) may be used to secure the fluid body portion 282 and axle 220 to one another. The axle 220 defines a portion (broadly, at least a portion) of the fluid passageway 266. In the illustrated embodiment, the entire axle 220 is hollow with open ends, one end defining or connected to the fluid inlet. Accordingly, the axle 220 can include a stop or plug 223 at the other end of the axle, the end opposite the fluid inlet 264, to prevent fluid from flowing out said one end of the axle. The plug 223 and fluid inlet 264 end of the axle 220 can be on either side of the axle 220. The fluid body portion 282 also defines a portion of the fluid passageway 266. The axle 220 defines a fluid passageway opening 221 (FIG. 14) to fluidly connect the portions of the fluid passageway 266 defined by the axle 220 and the fluid body portion 282. As shown in FIG. 14, the hose fitting 230 also defines a portion of the fluid passageway 266. The portion of the fluid passageway 266 defined by the fluid body portion 282 and hose fitting 230 is generally U-shaped and transports the fluid to the fluid outlet 232, which is radially spaced apart from the axle 220. The fluid body portion 282 and axle 220 form a fluid tight seal surrounding the fluid passageway openings 221.

The fluid body portion 282 is, preferably, integrally formed as a single, one-piece component. The fluid body portion 282 may be of generally any length. The fluid body portion 282 can be formed from metal, plastic (e.g., modeled plastic), glass filled nylon or any other suitable material. In the illustrated embodiment, the fluid body portion 282 is formed from plastic. As a result, the fluid body portion 282 includes several internal ribs to strengthen and stiffen the fluid body portion.

Still referring to FIGS. 12-17, the drum extension portion 290 (broadly, an extension portion), increases the length of the drum surface 228, thereby allowing the hose reel 210 to support hoses H of longer lengths. The drum extension portion 290 can be of generally any length, as desired. One end of the drum extension portion 290 is connected to the fluid body portion 282 and the other end of the drum extension portion is connected to one of the side flanges 18. In the illustrated embodiment, the drum extension portion 290 includes one or more fastener openings 245 (FIG. 13) at each end thereof that align with corresponding fastener openings in one of the side flanges 18 and the fastener openings 244 of the fluid body portion 282 so that fasteners 247 (FIG. 17), such as bolts, can be inserted there-though to connect the drum extension portion to said one side flange and fluid body portion, as discussed in more detail below. The fastener openings 245 may or may not be threaded. The drum extension portion 290 includes a circumferential exterior wall 292. The exterior wall 292 defines a portion of the drum surface 228. The exterior wall 292 defines a central opening 294, through which the axle 220 extends through.

The exterior wall 292 is generally cylindrically shaped. In one embodiment, the exterior wall 292 is formed from a piece of sheet metal cut and bent into shape, the opposite sides of the sheet metal connected together to form a continuous, cylindrical exterior wall.

Figure 16:
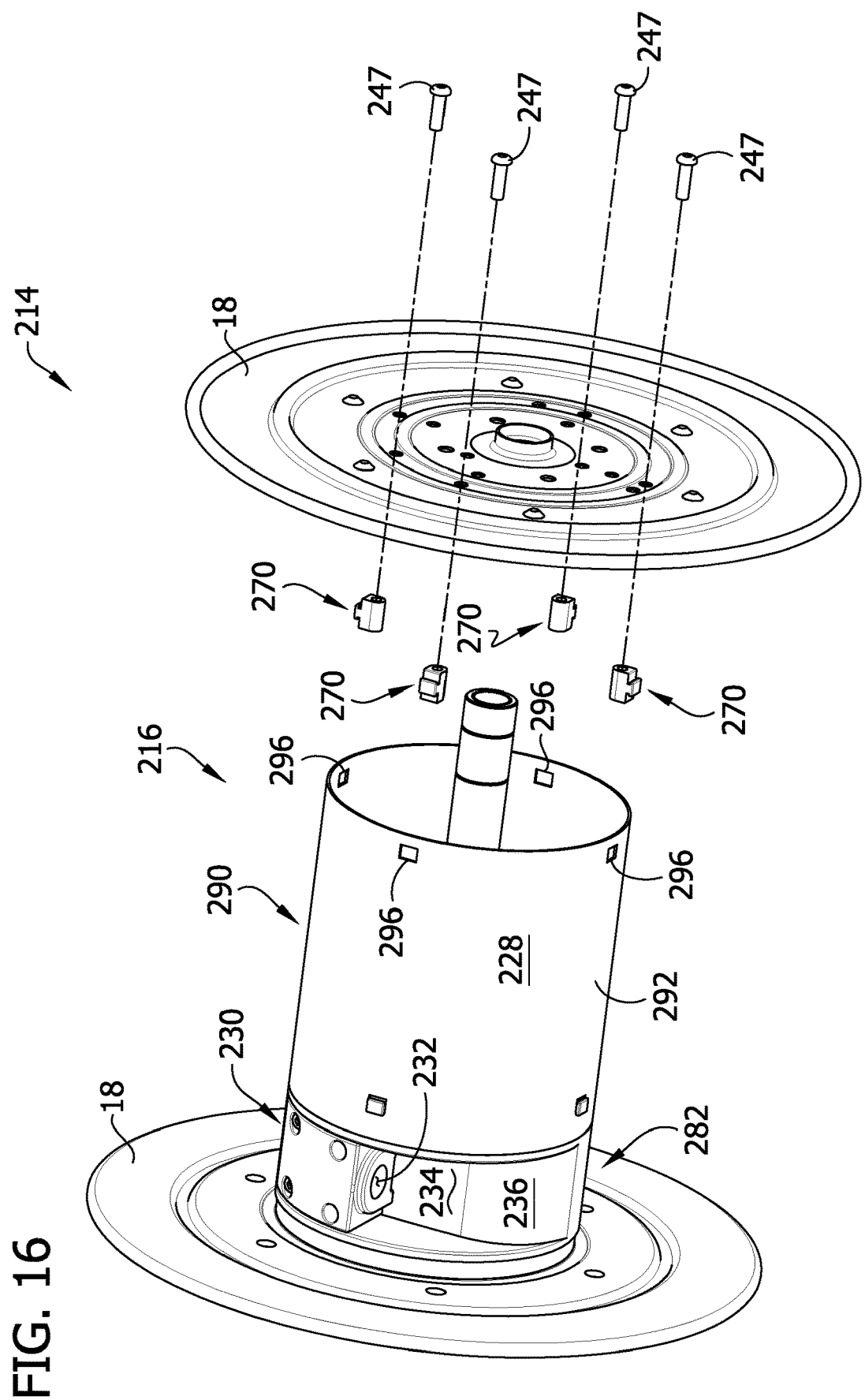
FIG. 16 is a partially exploded rear perspective of a reel assembly of the hose reel of FIG. 12.
Figure 17:
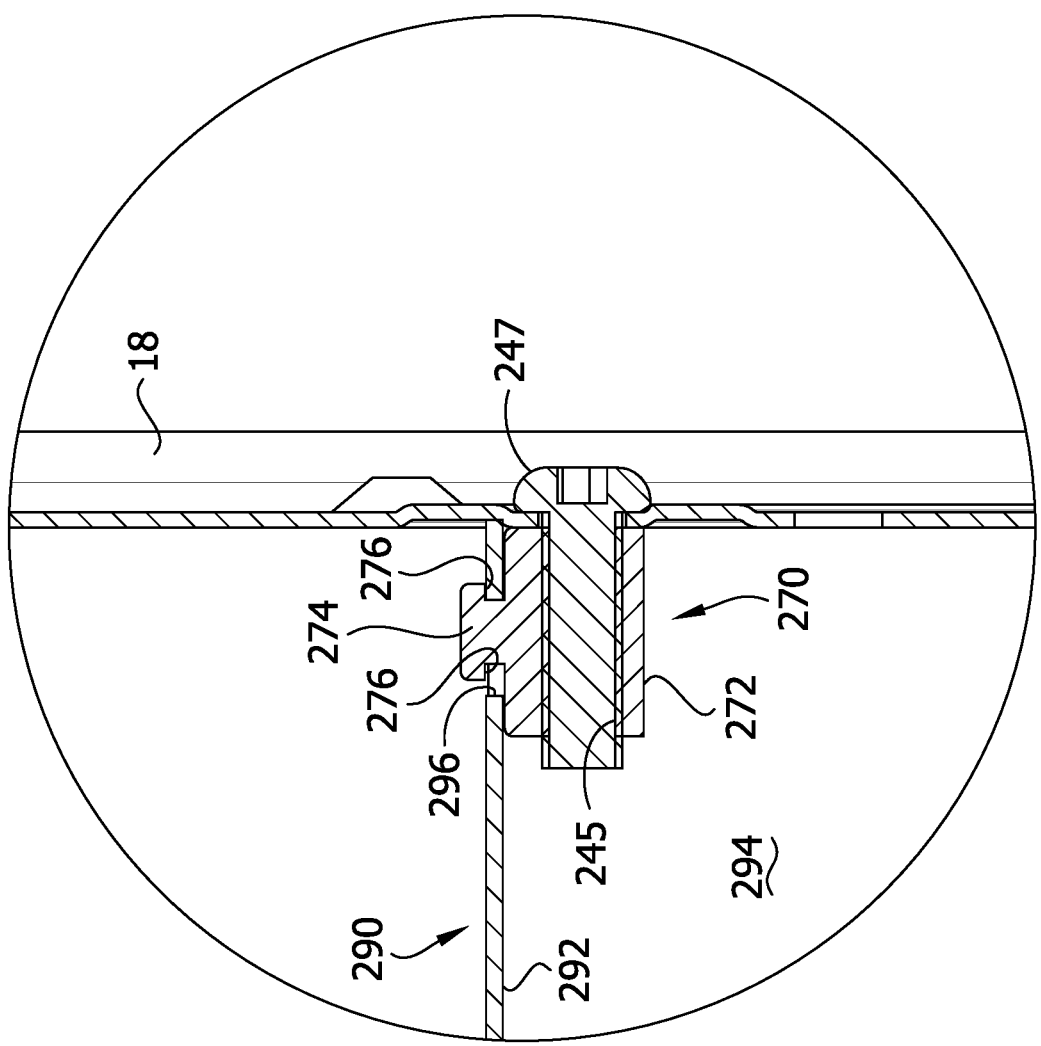
FIG. 17 is an enlarged fragmentary section of the connection between the drum assembly and a side flange of the reel assembly taken through line 17-17 of FIG. 12.

Referring to FIGS. 16 and 17, in this embodiment, the drum extension portion 290 includes clips 270 to connect the drum extension portion to the side flange 18 and fluid body portion 282. In particular, the clips 270 connect the exterior wall 292 to the side flange 18 and fluid body portion 282. The exterior wall 292 (broadly, the drum extension portion 290) defines one or more clip openings 296 (e.g., four clip openings) adjacent each end thereof. Each clip opening 296 receives one of the clips 270 to connect the exterior wall 292 to either the side flange 18 or fluid body portion 282. Each clip 270 has a body 272 that defines the opening 245 that receives the fastener 247. Each clip 272 has an engagement portion 274 that extends from the body 272 (e.g., generally radially outward from the opening 245). The engagement portion 274 is sized and shaped to extend through the clip opening 296. Together the engagement portion 274 and body 272 define a space 276 sized and shaped to receive a portion of the exterior wall 292. Broadly, the engagement portion 274 and body 272 define a notch or catch that receives and overlies the portion of the exterior wall 292 defining the clip opening 296. As shown in FIG. 17, the clip 270 is symmetrical about a vertical axis such that either end of the opening 245 can receive the fastener 247 and a space 276 of the clip with receive the exterior wall 292.

Referring to FIG. 17, when the drum extension portion 290 is attached to the side flange 18, each clip 270 extends through a corresponding clip opening 296 and engages the edge (e.g., edge margin) of the exterior wall 292 defining the clip opening. The edge of the exterior wall 292 is received in the space 276 defined by the clip 270. As mentioned above, the side flange 18 includes fastener openings that align with the fastener openings 245 of each clip 270. The fastener 247 is inserted through the aligned openings to draw the side flange 18 and clip 270 together, thereby pushing and holding the end of the exterior wall 292 against the side flange (e.g., clamping a portion of the exterior wall between the engagement portion 274 of the clip and the side flange). The side flange 18 may define a circumferential groove or channel the exterior wall 292 extends into to further secure the connection between the side flange and drum extension portion 290. The other end of the drum extension portion 290 is similarly attached to the fluid body portion 282. Each clip 270 extends through a clip opening 296 and is aligned with one of the fastener openings 244 of the fluid body portion 282 such that a fastener (not shown) can be inserted (e.g., threaded) through the aligned openings 244, 245 to secure the drum extension portion 290 to the fluid body portion. The fluid body portion 282 may include a recessed ledge 285 (FIG. 15) over which the end portion of the exterior wall 292 extends to further secure the connection between the fluid body portion and the drum extension portion 290. Thus, it is appreciated that the clip openings 296 are generally aligned corresponding ones of the fastener openings 244 of the fluid body portion 282 or one of the fastener openings of the side flange 18. The drum extension portion 290 provides greater resistance to the twisting and flexing placed on it by the rotation of the reel assembly 14 over conventional hose reels that use tie rods because the drum extension portion is able to carry the rotational forces throughout the continuous exterior wall 292. Moreover, it is understood that the clip 270 may be used in other context than hose reels to assembly or join parts together.

Referring to FIGS. 12-17, one method of assembling the reel assembly 14 is by assembling the reel assembly vertically (e.g., with the axis of rotation AR arranged generally vertically) before moving the reel assembly into the horizontal position shown in the hose reel 210. In this method, the fluid body portion 282 is attached to one of the side flanges 18 by inserting fasteners through the side flange into the fluid body portion. This subassembly is then placed with the attached side flange 18 down in the vertical orientation (e.g., the subassembly is placed on a flat surface with the side flange engaging the surface). Next, the axle 220 is attached to the fluid body portion 282. The clips 270 are mounted on drum extension portion 290 and the drum extension portion is positioned over the fluid body portion 282. The notches of the clips 270 hold (at least temporarily) the clips on the exterior wall 292 by an interference fit. The fastener openings 245 of the dips 270 are aligned with the fastener openings 244 in the fluid body portion 282 and fasteners are inserted therein to connect and secure the two components together. Once the fluid body portion 282 is secured, the other side flange 18 is slid onto the axle 220 and positioned over the drum extension portion 290. Again, the fastener openings 245 of the clips 270 are aligned with the fastener openings in the side flange 18 and fasteners 247 are inserted therein to connect and secure the two components together. The reel assembly 14 is now generally assembled (the hose fitting 230 can be connected to the fluid body portion 282 at any time) and it can be mounted to the frame 212. Although a certain order of steps is described herein, the order could be varied as will be understood by those of ordinary skill in the art. It is understood the other reel assemblies of the present disclosure may also be assembled vertically in a similar fashion. It is understood the relative difference in the constructions of the reel assemblies may vary the steps from those disclosed in relation to reel assembly 214 and that such variations are apparent to those of ordinary skill in the art.

Referring to FIGS. 18-23, another embodiment of a hose reel of the present disclosure is generally indicated at reference numeral 310. Hose reel 310 is similar to hose reel 10. For ease of comprehension, where hose reel 310 includes identical elements to that of hose reel 10, identical reference numerals are used and where similar or analogous elements are used, reference numerals "300" units higher are employed. In addition, where hose reel 310 includes similar or analogous elements to hose reel 210, reference numerals "100" units higher are employed. Hose reel 310 is generally the same as hose reel 10 except that hose reel 310 includes both an electric motor 26 and a crank 24 as the prime movers (broadly, the hose reel includes one or more prime movers) which are operatively coupled to the reel assembly 314. In addition, another difference is that drum assembly 316 has a different construction than drum assembly 16. However, it is understood drum assembly 316 is interchangeable with the other drum assemblies disclosed herein. As is apparent, drum assembly 316 includes many of the same elements and advantages as drum assemblies 16, 116 and 216. For example, drum assembly 316 includes a recess 334 in a drum surface 328 in which a fluid outlet 332 of a hose fitting 330 is disposed, Thus, where the drum assembly 316 includes similar or analogous elements and advantages as drum assemblies 16, 116 and 216, a detailed description of such elements and advantages is omitted with the understanding that the descriptions related to the elements and advantages of drum assemblies 16, 116 and 216 apply equally to drum assembly 316.

In this embodiment, the drum assembly 316 is configured to connect to the end of the hose H such that the end portion of the hose connected to the hose reel 310 is generally parallel to the axis of rotation AR of the reel assembly 314. The drum assembly 316 defines the recess 334 in the drum surface 328. The recess 334 extends radially inward toward the axle 320 (e.g., axis of rotation AR) from the drum surface 328. The drum assembly 316 includes the hose fitting 330 which defines the fluid outlet 332. The fluid outlet 332 is disposed within the recess 334 such that the fluid outlet is generally disposed between the axis of rotation AR (e.g., the axle 320) and the drum surface 328. As mentioned above, this configuration allows for successive layers of the hose to lay over the fluid outlet 332 without being obstructed by the hose fitting 330 or the end of the hose as the hose winds around the reel assembly 314.

The recess 334 guides the hose H from the fluid outlet 332 to the drum surface 328. In particular, the recess 334 guides or transitions the hose H from extending generally parallel to the axis of rotation AR from the fluid outlet 332 to extending generally perpendicular to the axis of rotation around the drum surface 328. In this embodiment, the fluid outlet 332 defines a plane that is generally perpendicular to the axis of rotation AR. As a result, due to the connection of the hose H to the hose fitting 330 at the fluid outlet 332, the hose extends from the fluid outlet in a direction that is generally parallel to the axis of rotation AR. The recess 334 then guides hose H to extend from the recess and around the drum surface 328 in a direction that is generally perpendicular to the axis of rotation AR. The hose fitting 330 generally defines one end of the recess 334. The recess is also defined by generally opposite side walls 338 of the drum assembly 316.

Figure 18:
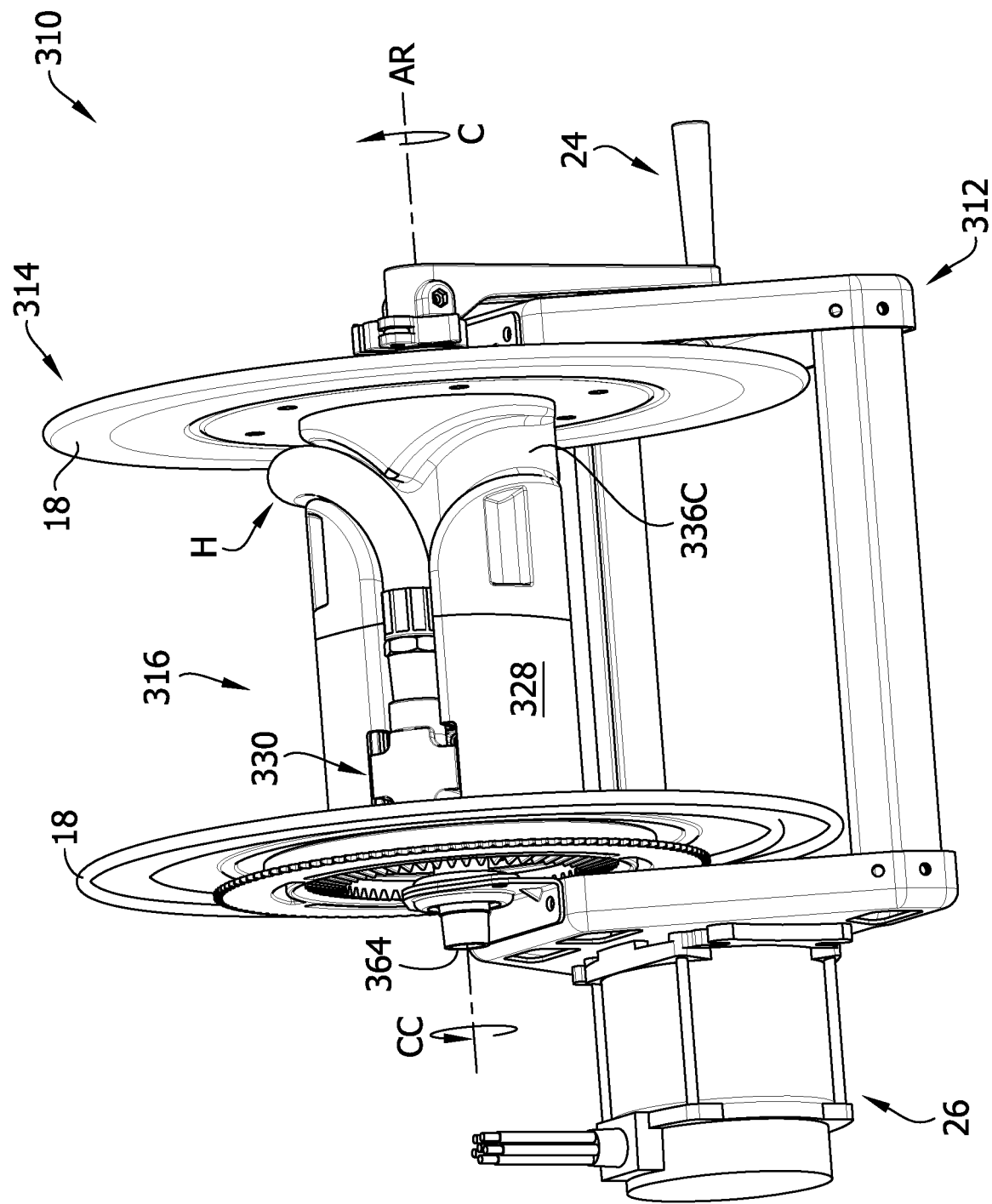
FIG. 18 is a perspective of another embodiment of a hose reel of the present disclosure having a hose coupled thereto.
Figure 19:
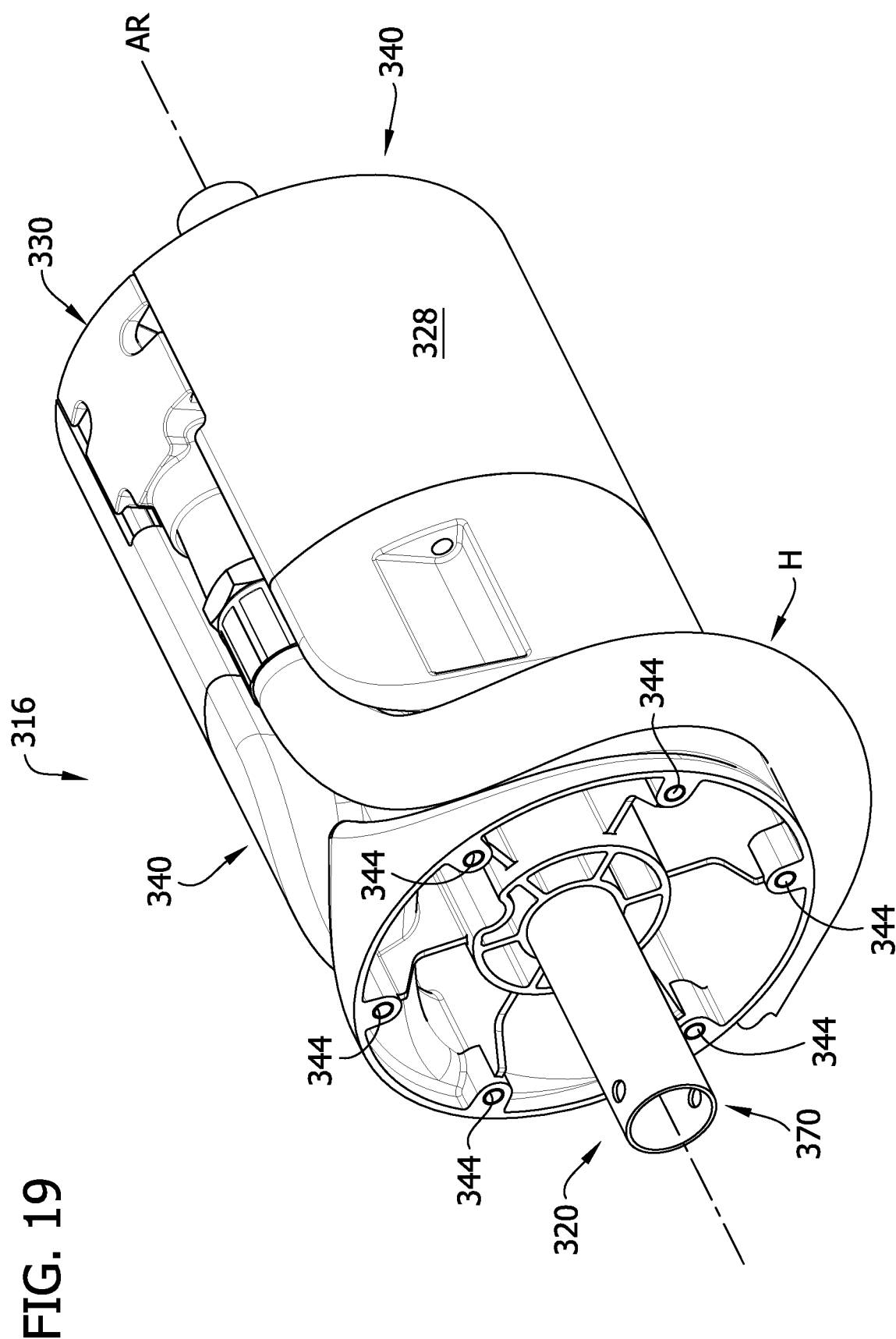
FIG. 19 is a rear perspective of a drum assembly of the hose reel of FIG. 18 coupled to the end of the hose.

In the illustrated embodiment, the recess 334 includes three (e.g., first, second and third) recess sections 334A, 334B and 334C, respectively. The first recess section 334A extends from the fluid outlet 332 (e.g., hose fitting 330) in a direction that is generally parallel to the axis of rotation AR. The first recess section 334A defines a longitudinal axis that is generally parallel to the axis of rotation. The first recess section 334A receives the end portion of the hose H and positions the end portion of the hose such that the end portion is generally parallel to the axis of rotation AR. The end portion of the hose H is located below the drum surface 328. Each of the second and third recess sections 334B, 334C extend from the end of the first recess section 334A opposite the hose fitting 330. The second and third recess sections 334B, 334C are mirror images of one another. Each of the second and third recess sections 334B, 334C guide the hose from the first recess section 334A (e.g., from extending in a direction generally parallel to the axis of rotation AR) to the drum surface 328 (e.g., to extending in a direction generally perpendicular to the axis of rotation). The second recess section 334B is configured (e.g., sized and shaped) to guide the hose H to the drum surface 328 such that the hose extends from the second recess section in a first direction that is generally perpendicular to the axis of rotation AR to coil the hose in a clockwise C direction around the drum surface (e.g., clockwise rotation of the drum assembly 316 winds the hose on the drum assembly). The arrangement of the hose H in the second recess section 334B for clockwise C coiling of the hose is shown in FIGS. 18 and 19. Similarly, the third recess section 334C is configured (e.g., sized and shaped) to guide the hose H to the drum surface 328 such that the hose extends from the third recess section in a second direction that is generally perpendicular to the axis of rotation AR to coil the hose in a counter-clockwise CC direction around the drum surface (e.g., counter-clockwise rotation of the drum assembly 316 winds the hose on the drum assembly). Thus, each of the second and third recess sections 334B, 334C positions the hose H in the orientation the hose will coil around the drum assembly 16. In this manner, the drum assembly 316 is configured for both clockwise C and counter-clockwise CC winding of the hose H. This allows an operator to select a desired direction to wind the hose H on the drum assembly 316. Each of the second and third recess section 334B, 344C are curved (in opposite directions) to provide a generally smooth transition for the hose H from extending generally parallel to extending generally perpendicular to the axis of rotation AR.

Figure 21:
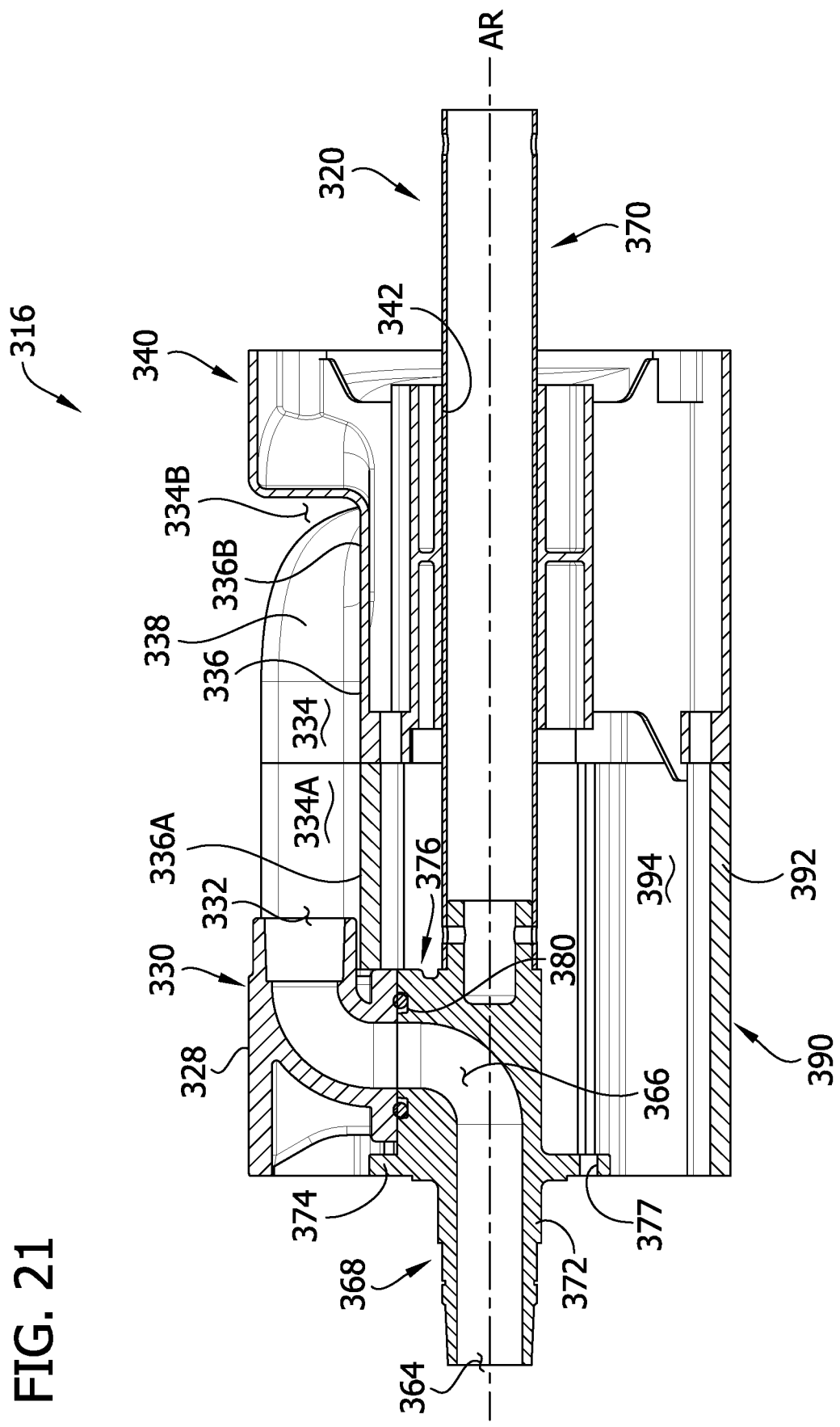
FIG. 21 is a cross-section of the drum assembly taken through line 21-21 of FIG. 20.
Figure 23:
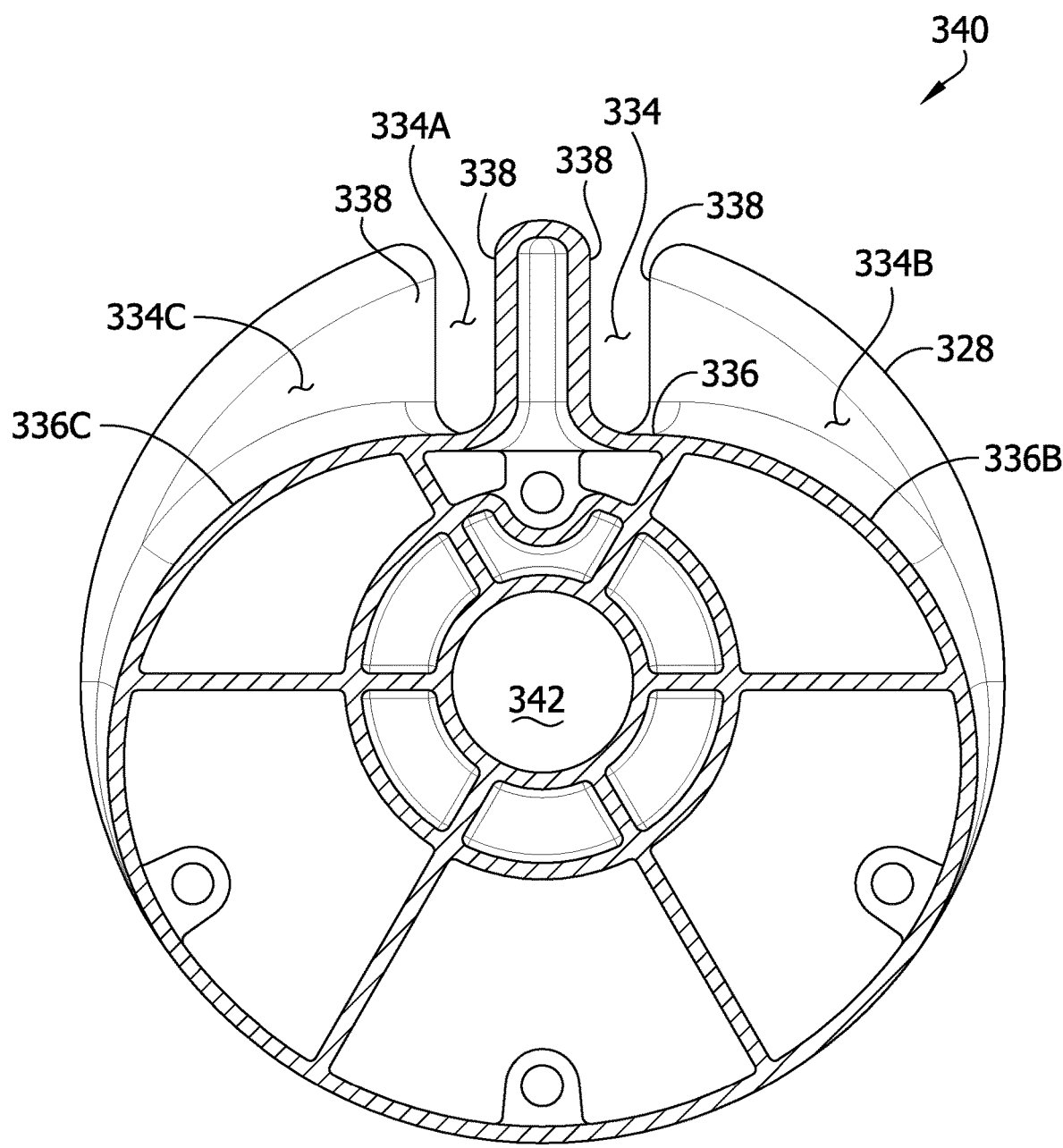
FIG. 23 is a cross-section of a hose guide portion of the drum assembly taken through line 23-23 of FIG. 22.

The drum assembly 316 includes a recess surface 336 defining the base of the recess 334. As shown in FIGS. 21 and 23, the recess surface 336 extends from about the fluid outlet 32 (e.g., from generally below or radially inward of the fluid outlet) to the drum surface 328. The recess surface 336 includes three (e.g., first, second and third) recess surface sections 336A, 336B, 336C, each defining the respective base of the first, second and third recess sections 334A, 334B, 334C. The recess 334 has a depth extending between the drum surface 328 and the recess surface 336. The depth of the first recess section 334A at the fluid outlet 332 is preferably larger than the diameter of the hose H to enable the entire coupler F to be received in the recess 334 below the drum surface 328. However, it will be understood that the hose H may be only partially located below the drum surface 328 when received in the first recess section 334A. In the illustrated embodiment, the first recess section 334A has a consistent depth as the first recess section extends from the hose fitting 330. As each of the second and third recess section 334B, 334C extend from the first recess section 334A, the depth of the second and third recess sections 334B, 334C decreases to bring the hose H to drum surface 328. In other words, the depth of the second and third recess sections 334B, 334C (e.g., the recess 334) increases (e.g., gradually increases) as the second and third recess surface sections 336B, 336C (e.g., the recess surface 336) extend from the drum surface 328 toward the fluid outlet 332. In the illustrated embodiment, the second and third recess surface sections 336B, 336C are curved about the axis of rotation AR. In addition, a longitudinal axis defined by each of the second and third recess surface sections 336B, 336C (e.g., second and third recess sections 334B, 334C) is curved about an imaginary line extending through and perpendicular to the axis of rotation AR to facilitate the transition of the hose H from extending generally parallel to extending generally perpendicular to the axis of rotation (e.g., the second and third recess sections are curved in two directions). This provides a smooth transition for the hose H as the hose extends out from the recess 334 and around the drum surface 328.

Referring to FIGS. 19-23, the particular configuration and construction of the drum assembly 316 will now be described. As is apparent, other configurations and constructions of the drum assembly 316 are within the scope of the present disclosure. It is understood that one or more of the elements discussed above may be defined and/or a part of one or more of the components of the drum assembly 316. In this embodiment, the drum assembly 316 includes a drum body portion 340 and a drum extension portion 390. The drum body portion 340 and drum extension portion 390 are connected to one another and each define a portion of the drum surface 328. One end or side of the drum body portion 340 is configured to connect to one of the side flanges 18 and the other side of the drum body portion is configured to connect to the drum extension portion 390. Each end of the drum body portion 340 includes one or more fastener openings 344 (e.g., six fastener openings) that receive fasteners (not shown), such as bolts, to attach the drum body portion to either the side flange 18 or drum extension portion 390, as discussed in more detail above in the other embodiments. The drum body portion 340 defines a central opening 342 extending there-through. The axle 320 extends through the central opening 342. The drum body portion 340 is generally cylindrically shaped and defines a portion (e.g., approximately half) of the drum surface 328. The drum body portion 340 may be of generally any length. The drum body portion 340 defines a portion of the recess 334. In the illustrated embodiment, the drum body portion 340 defines a portion of the first recess section 334A, the second recess section 334B and the third recess section 334C. Other configurations are within the scope of the present disclosure. For example, the drum body portion may not define any portion of the firs recess section.

The drum body portion 340 is, preferably, integrally formed as a single, one-piece component. The drum body portion 340 can be formed from metal, plastic, glass filled nylon or any other suitable material. In the illustrated embodiment, the drum body portion 340 is molded from plastic. As a result, the drum body portion 340 includes several internal ribs (FIG. 23) to strengthen and stiffen the drum body portion.

Figure 22:
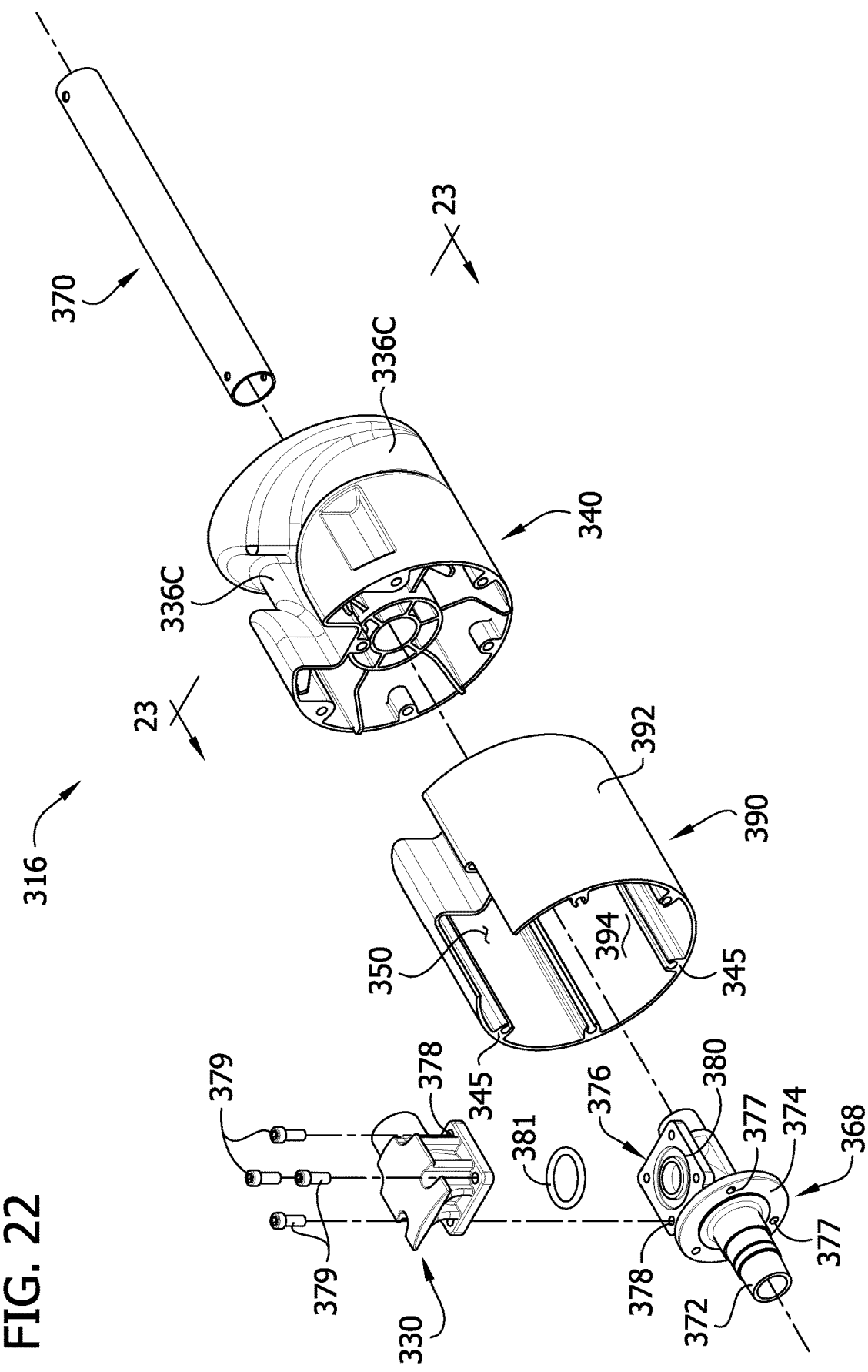
FIG. 22 is an exploded front perspective of the drum assembly of FIG. 20.

The drum extension portion 390 (broadly, an extension portion) is also generally cylindrically shaped and defines a portion (e.g., approximately half) of the drum surface 328. The drum body portion 340 may be of generally any length (or at least of a few standard lengths) and be used to increase the length of the drum surface 328, thereby allowing the hose reel 310 to support hoses H of longer lengths. The drum extension portion 390 defines a portion of the recess 334. In the illustrated embodiment, the drum extension portion 390 defines a portion of the first recess section 334A. The drum extension portion 390 also defines a space 350 in which the hose fitting 330 is disposed, as discussed in more detail below (FIG. 22). The drum extension portion 390 includes a circumferential exterior wall 392. The exterior wall 392 defines a portion of the drum surface 328. The exterior wall 392 defines a central opening 394, through which the axle 320 extends through. The exterior wall 392 is generally cylindrically shaped. On end of the drum extension portion 390 connects to one of the side flanges 18 and the other end connects to the drum body portion 340. In the illustrated embodiment, the drum extension portion 390 is formed from extruded aluminum, which provides greater rigidity (as opposed to sheet metal bend to form a cylinder). The drum extension portion 390 provides greater resistance to the twisting and flexing placed on it by the rotation of the reel assembly 314 over conventional hose reels that use tie rods by carrying the rotational forces through the generally continuous exterior wall 392. The drum extension portion 390 includes one or more C-shaped channels 345 that receive fasteners (not shown), such as self-tapping screws, to connect drum extension portion to one of the side flanges 18 and drum body portion 340, as discussed in more detail above in the other embodiments. Other configurations of the drum extension portion are within the scope of the present disclosure.

The hose reel 10 includes (e.g., defines) a fluid inlet 364 (FIG. 21) configured to be fluidly connected to a fluid source (not shown). The fluid inlet 364 is disposed adjacent or next to one end of the axle 320. In the illustrated embodiment, one end of the axle 320 defines the fluid inlet 364. The reel assembly 314, in particular the drum assembly 316, defines a fluid passageway 366 (FIG. 21) extending from the fluid inlet 364 to the fluid outlet 332 to fluidly connect the hose H to the fluid source. The axle 320 defines a portion (broadly, at least a portion) of the fluid passageway 366. In the illustrated embodiment, the drum assembly 316 includes an axle 320 (broadly, an axle assembly) that includes a fluid body portion 368 and a shaft 370. Fluid body portion 368 is generally the same as fluid body portion 68 except that fluid body portion 368 defines a curved (e.g., 90 degree elbow) portion of the fluid passageway that directs the fluid into the hose fitting 330 (FIG. 21). The shaft 370 is coupled to the fluid body portion 368. Preferably, the hose fitting 330 is releasably coupled to the fluid body portion (broadly, a portion of the drum assembly 316). In the illustrated embodiment, one or more fasteners 379 are used to secure the hose fitting 330 to the fluid body portion 368.

Figure 5:
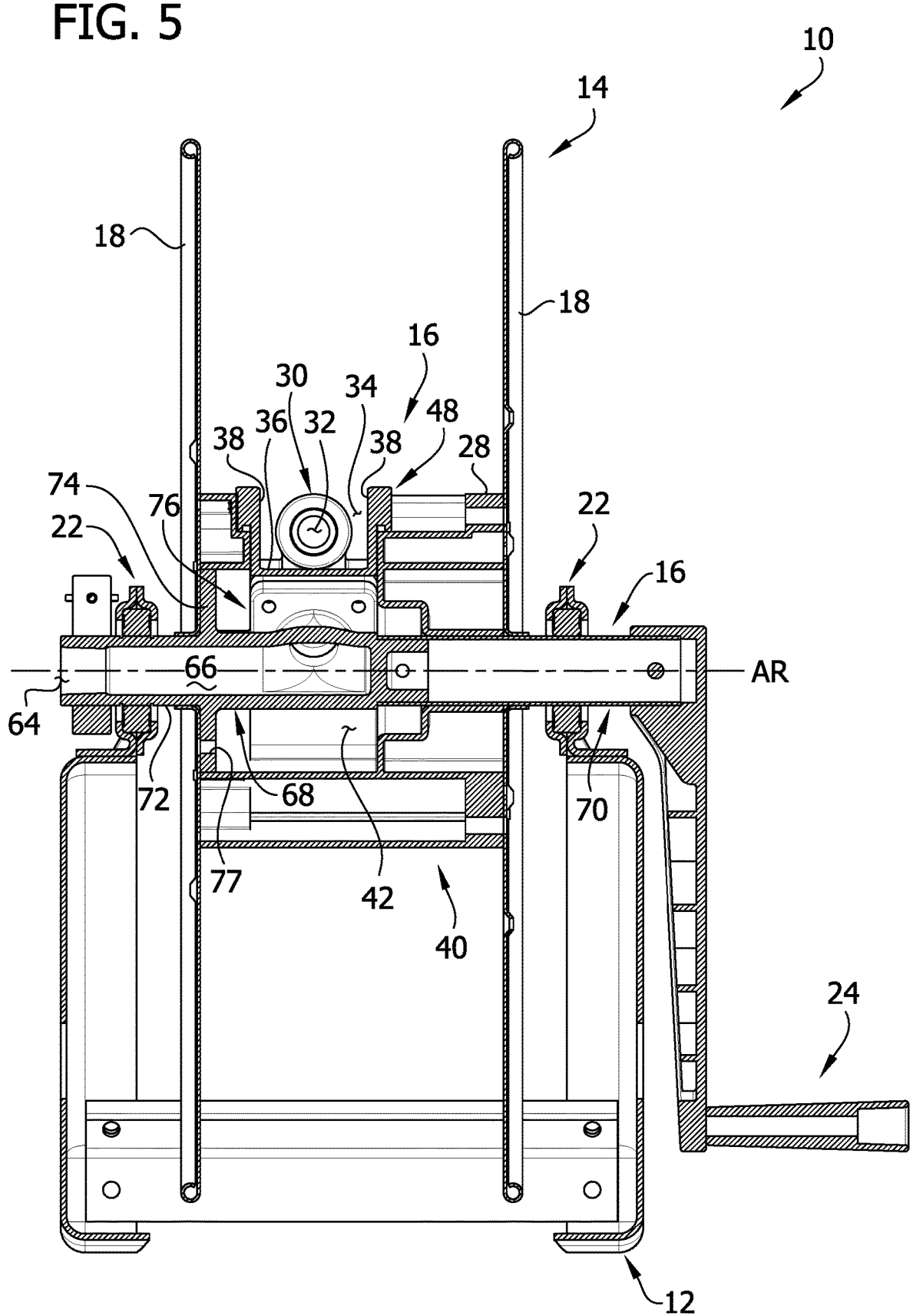
FIG. 5 is a cross-section of the hose reel taken through line 5-5 of FIG. 1, with the hose removed.
Figure 6:
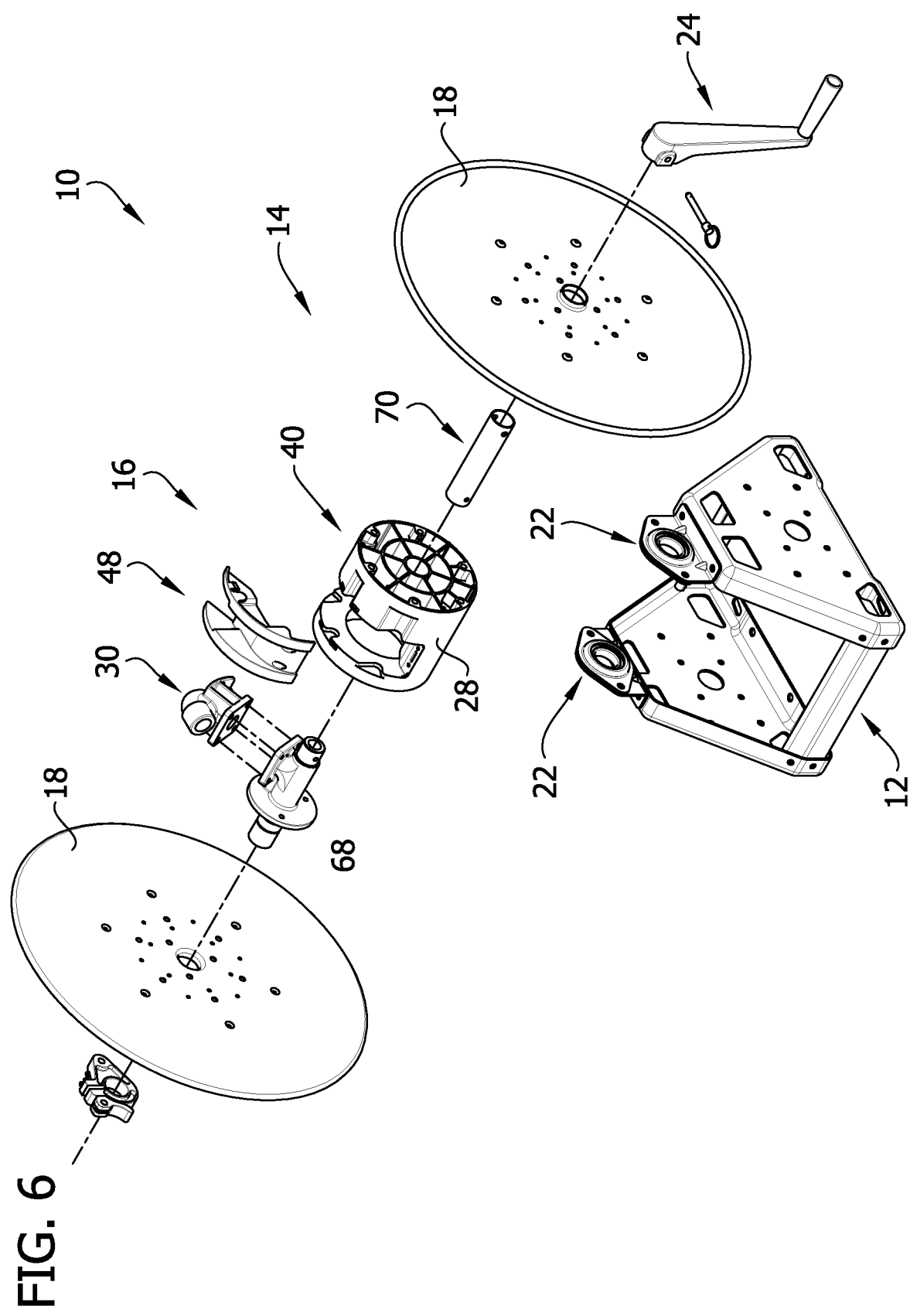
FIG. 6 is an exploded perspective of the hose reel.
Figure 7:
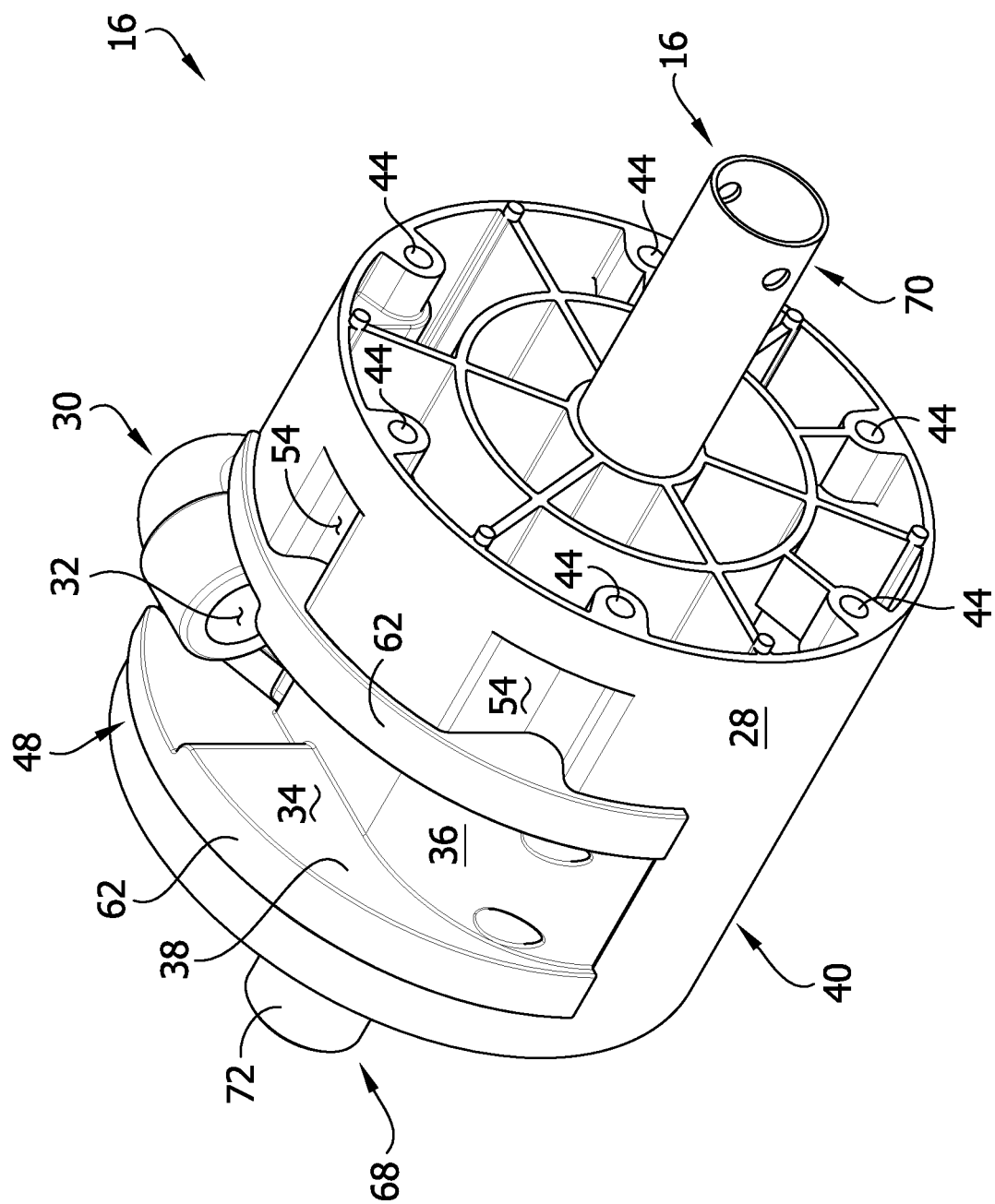
FIG. 7 is a front perspective of a drum assembly of the hose reel.

Referring to FIG. 21, the fluid passage 366 has a generally S-shape or double curved shape. The S-shape of the fluid passage provides a generally smooth flow path between the radially spaced apart fluid outlet 332 and fluid inlet 364. In the illustrated embodiment, the fluid passage 366 includes two curved 90 degree turns. The fluid body portion 368 defines the first 90 degree turn so that the fluid passage extends generally perpendicularly to (e.g., radially outward from) the axis of rotation AR. The start of this 90 degree turn is generally aligned with the axis of rotation AR. The hose fitting 330 defines the second 90 degree turn so that the fluid passage extends generally parallel to the axis of rotation AR toward the fluid outlet 332. The start of this second 90 degree turn is generally perpendicular to the axis of rotation. Other shapes of the fluid passage 366 are within the scope of the present disclosure. For example, the fluid passage can have two 45 degree turns at opposite ends connected by an angled middle portion (not shown), or a t-shaped end with a 90 degree turn, as shown in FIG. 5.

Figure 20:
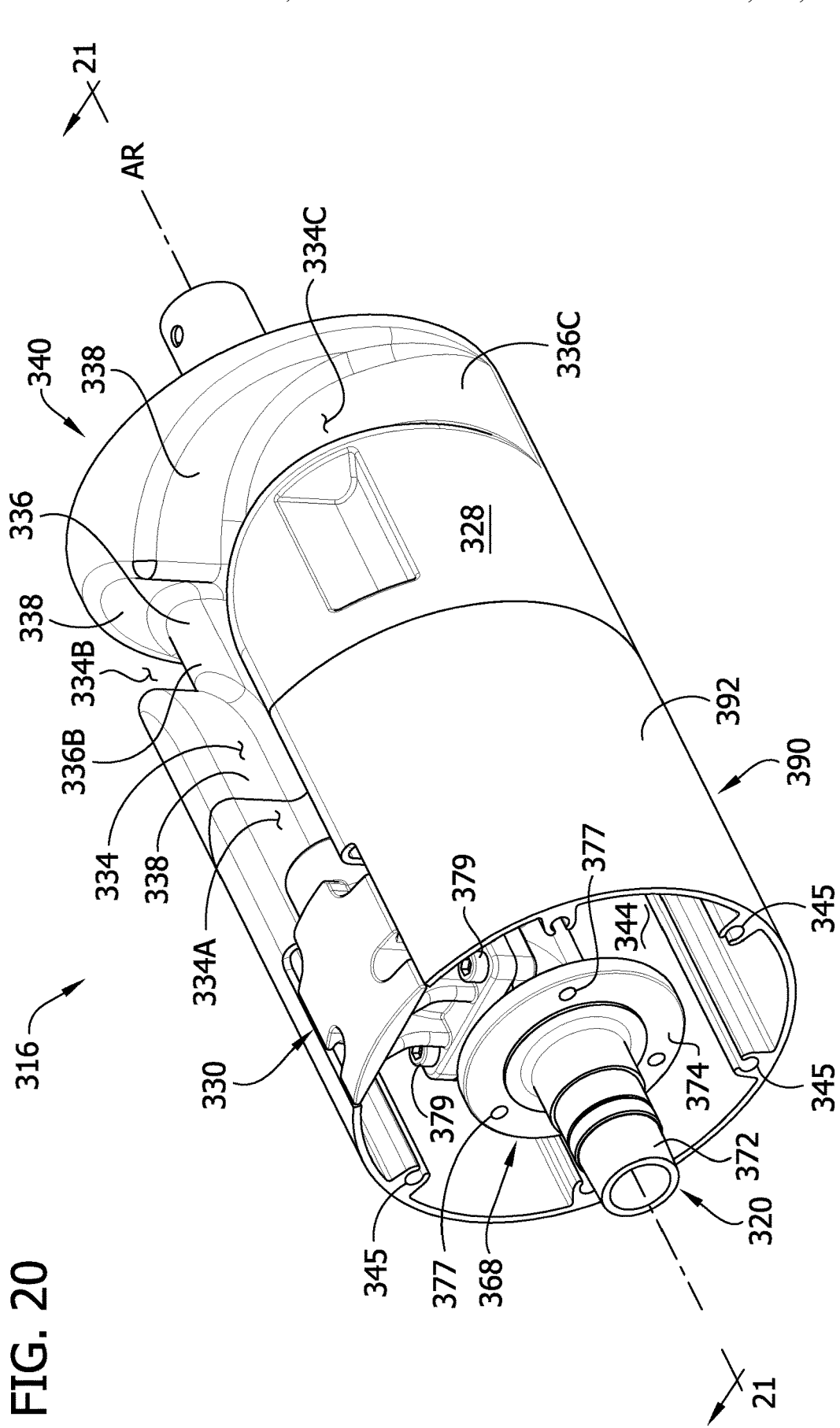
FIG. 20 is a front perspective of the drum assembly.

Referring back to FIGS. 18-23, when the connector portion 376 of the fluid body portion 368 is positioned within the drum extension portion 390, the connector portion is generally aligned with the space (e.g., opening) 350 defined by the drum extension portion 390. When connected to the fluid body portion 368, the hose fitting 330 is disposed in and extends through the space 350. In this position, the fluid outlet 332 of the hose fitting 330 is disposed in the recess 334. As described above, the fasteners 379 used to secure the hose fitting 330 to the fluid body portion 368 are accessible by a tool from the exterior of the drum assembly 316. In addition, in this embodiment, the hose fitting 330 defines a portion of the drum surface 328. The hose fitting 330 includes an exterior surface having a curve generally matching the curve of the exterior surface drum extension portion 290 (FIG. 20). As shown in FIG. 20, the hose fitting 330 defines notches or cutouts in the curved exterior surface to permit a tool, such as a screw driver, to be inserted there-through in order to reach the fasteners 379.

It is apparent that the elements, features, and/or teachings set forth in each embodiment disclosed herein are not limited to the specific embodiment(s) the elements, features, and/or teachings are described in. Accordingly, it is understood that the elements, features, and/or teachings described in one embodiment may be applied to one or more of the other embodiments disclosed herein.

Having described the invention in detail, it will be apparent that modifications and variations are possible without departing from the scope of the invention defined in the appended claims. For example, where specific dimensions are given, it is understood these dimensions are illustrative and other dimensions are within the scope of the present disclosure.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above products and methods without departing from the scope of the invention, it is intended that all matter contained in the above description shall be interpreted as illustrative and not in a limiting sense.

What is claimed is:

1. A hose reel for coiling a hose, the hose reel comprising:
a frame; and
a reel assembly rotatably connected to the frame about an axis of rotation, the reel assembly including;
first and second side flanges; and
a drum assembly including a drum and a hose fitting defining a fluid outlet, the drum having opposite first and second end portions, the first side flange engaging the first end portion of the drum and the second side flange engaging the second end portion of the drum, the hose fitting configured to be connected to one end of the hose to fluidly connect the hose to the fluid outlet, the hose fitting being releasably coupled to a remainder of the drum assembly, the drum assembly having a drum assembly surface arranged to receive and support the hose between the first and second side flanges as the drum assembly is rotated about the axis of rotation to coil the hose around the drum assembly surface, the drum assembly defining a recess in the drum assembly surface in which the fluid outlet of the hose fitting is disposed when the hose fitting is coupled to the remainder of the drum assembly such that at least a portion of the fluid outlet is disposed between the axis of rotation and the drum assembly surface, the drum assembly surface including a first portion and a second portion, the hose fitting defining the first portion of the drum assembly surface, the first portion of the drum assembly surface being arranged with respect to the second portion of the drum assembly surface to form a continuation of the second portion of the drum assembly surface when the hose fitting is coupled to the remainder of the drum assembly.

2. The hose reel of claim 1, wherein the fluid outlet is disposed entirely between the axis of rotation and the drum assembly surface.

3. The hose reel of claim 1, wherein the drum assembly includes a recess surface defining the base of the recess, the recess surface extending from about the fluid outlet to the drum assembly surface.

4. The hose reel of claim 3, wherein the recess has a depth extending between the drum assembly surface and the recess surface, the depth of the recess increasing as the recess surface extends from the drum assembly surface toward the fluid outlet.

5. The hose reel of claim 4, wherein at least a portion of the recess surface is curved about the axis of rotation.

6. The hose reel of claim 1, wherein the recess is configured to guide the hose from the fluid outlet to the drum assembly surface such that the hose extends from the recess in a direction that is generally perpendicular to the axis of rotation.

7. The hose reel of claim 6, wherein the fluid outlet defines a plane that is generally parallel to the axis of rotation.

8. The hose reel of claim 6, wherein the recess includes a first recess section configured to guide the hose to the drum assembly surface such that the hose extends from the first recess section in a first direction that is generally perpendicular to the axis of rotation to coil the hose in a clockwise direction around the drum assembly surface and a second recess section configured to guide the hose to the drum assembly surface such that the hose extends from the second recess section in a second direction that is generally perpendicular to the axis of the rotation to coil the hose in a counter-clockwise direction around the drum assembly surface.

9. The hose reel of claim 8, wherein the fluid outlet defines a plane that is generally perpendicular to the axis of rotation.

10. The hose reel of claim 9, wherein the recess includes a third recess section configured to guide the hose from the fluid outlet to the first and second recess sections, the third recess section defining a longitudinal axis that is generally parallel to the axis of rotation.

11. The hose reel of claim 1, wherein the hose fitting is releasably coupled to the remainder of the drum assembly with a fastener.

12. The hose reel of claim 11, wherein the drum assembly surface defines an aperture aligned with the fastener, the aperture sized and shaped to permit a tool to extend therethrough to engage the fastener.

13. The hose reel of claim 11, wherein the fastener includes a shaft that extends in a direction that is generally perpendicular to the axis of rotation.

14. The hose reel of claim 1, further comprising a fluid inlet configured to be fluidly connected to a fluid source and a fluid passageway extending from the fluid inlet to the fluid outlet to fluidly connect the hose to the fluid source.

15. The hose reel of claim 14, wherein the drum assembly includes an axle rotatably connected to the frame and defining the axis of rotation, the axle defining a portion of the fluid passageway.

16. The hose reel of claim 15, wherein the axle includes a fluid body portion defining said portion of the fluid passageway and a shaft coupled to the fluid body portion.

17. The hose reel of claim 16, wherein the hose fitting is releasably coupled to the fluid body portion.

18. The hose reel of claim 17, further comprising a seal disposed between the hose fitting and the fluid body portion to form a fluid tight seal between the hose fitting and the fluid body portion when the hose fitting and fluid body portion are coupled together.

19. The hose reel of claim 1, further comprising a prime mover operatively coupled to the reel assembly to rotate the reel assembly about the axis of rotation.

20. The hose reel of claim 1, in combination with the hose.

21. A hose reel for coiling a hose, the hose reel comprising:
a frame; and
a reel assembly rotatably connected to the frame about an axis of rotation, the reel assembly including a drum assembly having a drum assembly surface configured to receive and support the hose as the drum assembly is rotated about the axis of rotation to coil the hose around the drum assembly surface, the drum assembly including a hose fitting defining a fluid outlet, the fluid outlet being spaced apart from the axis of rotation, the hose fitting configured to be connected to one end of the hose to fluidly connect the hose to the fluid outlet, the hose fitting being arranged such that the hose extends from the hose fitting in a first direction that is generally parallel to the axis of rotation when the hose fitting is connected to the hose, the drum assembly defining a recess in the drum assembly surface in which the fluid outlet of the hose fitting is disposed such that at least a portion of the fluid outlet is disposed between the axis of rotation and the drum assembly surface, the recess being configured to guide the hose from the fluid outlet to the drum assembly surface such that the hose extends from the recess in a second direction that is different from the first direction.

22. The hose reel of claim 21, wherein the reel assembly further includes first and second side flanges connected to opposite first and second ends of the drum assembly, respectively.

23. The hose reel of claim 21, wherein the second direction is generally perpendicular to the first direction.

24. The hose reel of claim 21, wherein the recess is configured to guide the hose from the fluid outlet to the drum assembly surface such that the hose extends from the recess in a third direction that is different from the first direction and the second direction.

25. The hose reel of claim 24, wherein the third direction is generally perpendicular to the first direction.

26. The hose reel of claim 21, wherein the recess includes a first recess section configured to guide the hose to the drum assembly surface such that the hose extends from the first recess section in the second direction to coil the hose in a clockwise direction around the drum assembly surface.

27. The hose reel of claim 26, wherein the recess includes a second recess section configured to guide the hose to the drum assembly surface such that the hose extends from the second recess section in a third direction to coil the hose in a counter-clockwise direction around the drum assembly surface.

28. The hose reel of claim 27, wherein the recess includes a third recess section configured to guide the hose from the hose fitting in the first direction, the first and second recess sections connected to an end of the third recess section.

29. The hose reel of claim 21, wherein the fluid outlet defines a plane that is generally perpendicular to the axis of rotation.

30. The hose reel of claim 21, wherein the hose fitting is releasably coupled to a remainder of the drum assembly.

31. The hose reel of claim 21, wherein the drum assembly includes a recess surface defining the base of the recess, the recess surface extending from about the fluid outlet to the drum assembly surface.

32. The hose reel of claim 31, wherein the recess has a depth extending between the drum assembly surface and the recess surface, the depth of the recess increasing as the recess surface extends from the drum assembly surface toward the fluid outlet.

33. The hose reel of claim 31, wherein at least a portion of the recess surface is curved about the axis of rotation.

* * * * *